United States Patent
Yuan et al.

(10) Patent No.: US 8,295,485 B2
(45) Date of Patent: Oct. 23, 2012

(54) QUANTUM COMMUNICATION SYSTEM

(75) Inventors: Zhiliang Yuan, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 899 days.

(21) Appl. No.: 11/530,358

(22) Filed: Sep. 8, 2006

(65) Prior Publication Data

US 2007/0116286 A1 May 24, 2007

(30) Foreign Application Priority Data

Sep. 9, 2005 (GB) .................................. 0518467.6

(51) Int. Cl.
*H04K 1/00* (2006.01)

(52) U.S. Cl. ............ 380/256; 380/28; 380/44; 380/255; 380/278; 375/353; 375/354; 713/168; 398/130; 398/202

(58) Field of Classification Search .................. 380/31, 380/44, 252, 255, 256, 278, 28; 375/148, 375/353, 354; 713/150, 168; 398/202, 130
See application file for complete search history.

(56) References Cited

U.S. PATENT DOCUMENTS

| | | | | |
|---|---|---|---|---|
| 4,267,591 A * | 5/1981 | Wissel et al. | ................. | 370/204 |
| 5,247,382 A * | 9/1993 | Suzuki | ........................ | 398/201 |
| 5,438,592 A * | 8/1995 | Boccuzzi | ..................... | 375/283 |
| 5,719,628 A * | 2/1998 | Ohki | ......................... | 348/402.1 |
| 6,289,104 B1 * | 9/2001 | Patterson et al. | ............. | 380/283 |
| 6,529,601 B1 * | 3/2003 | Townsend | .................... | 380/256 |
| 6,686,879 B2 * | 2/2004 | Shattil | .......................... | 342/367 |
| 6,782,211 B1 * | 8/2004 | Core | .............................. | 398/205 |
| 7,359,513 B2 * | 4/2008 | Gisin et al. | ................... | 380/256 |
| 7,428,562 B2 * | 9/2008 | Beausoleil et al. | .......... | 708/255 |
| 7,443,514 B2 * | 10/2008 | Harned et al. | ............... | 356/512 |
| 7,460,669 B2 * | 12/2008 | Foden et al. | ................. | 380/256 |
| 2001/0034871 A1 * | 10/2001 | Takeda et al. | ................ | 714/781 |
| 2002/0097874 A1 * | 7/2002 | Foden et al. | ................. | 380/256 |
| 2002/0196827 A1 * | 12/2002 | Shields et al. | ................. | 372/45 |
| 2004/0047402 A1 * | 3/2004 | Hui et al. | ...................... | 375/148 |
| 2004/0190725 A1 * | 9/2004 | Yuan et al. | ................... | 380/283 |
| 2004/0233935 A1 * | 11/2004 | Yuan et al. | ................... | 370/474 |
| 2004/0234264 A1 * | 11/2004 | Sasaki et al. | ................... | 398/65 |

(Continued)

FOREIGN PATENT DOCUMENTS

WO  WO 2006/074151 A2  7/2006

OTHER PUBLICATIONS

Charles H. Bennett, et al., "Quantum Cryptography: Public Key Distribution and coin Tossing", International Conference on Computers, Systems & Signal Processing Bangalore, India, Dec. 10-12, 1984, pp. 175-179.

(Continued)

*Primary Examiner* — Philip Chea
*Assistant Examiner* — Shanto M Abedin
(74) *Attorney, Agent, or Firm* — Oblon, Spivak, McClelland, Maier & Neustadt, L.L.P.

(57) ABSTRACT

A measuring unit for determining information from an input signal, the unit comprising a decoder configured to perform a measurement on said input signal using two operators, a first operator configured to distinguish between two orthogonal states of said input signal and a second operator selected from an inverting operator configured to invert the result of the measurement by the first operator and a null operator configured to have a null effect on the result of the measurement by the first operator.

18 Claims, 15 Drawing Sheets

U.S. PATENT DOCUMENTS

| | | | | |
|---|---|---|---|---|
| 2004/0258131 | A1* | 12/2004 | Margon | 375/130 |
| 2005/0047601 | A1* | 3/2005 | Shields et al. | 380/283 |
| 2005/0100351 | A1* | 5/2005 | Yuan et al. | 398/214 |
| 2005/0111665 | A1 | 5/2005 | Ichimura et al. | |
| 2007/0223698 | A1* | 9/2007 | Tsurumaru | 380/256 |
| 2010/0027794 | A1* | 2/2010 | Yuan et al. | 380/255 |

OTHER PUBLICATIONS

Peter Moller Nielsen et al., "Experimental quantum key distribution with proven security against realistic attacks", Journal of Modern Optics, vol. 48, No. 13, pp. 1921-1942 (2001).

* cited by examiner

| Alice Encoding | | Bob | | | Detector A | Detector B | Agreed Bit Value |
|---|---|---|---|---|---|---|---|
| | | Basis | Inversion | Phase | | | |
| Sifting basis I (orthogonal) | 0° (bit 0) | I | No | 0° | 100% | 0% | 0 |
| | | II | No | 90° | 50% | 50% | n/a |
| | | I | Yes | 180° | 0% | 100% | 0 |
| | | II | Yes | 270° | 50% | 50% | n/a |
| | 180° (bit 1) | I | No | 0° | 0% | 100% | 1 |
| | | II | No | 90° | 50% | 50% | n/a |
| | | I | Yes | 180° | 100% | 0% | 1 |
| | | II | Yes | 270° | 50% | 50% | n/a |
| Sifting basis II (orthogonal) | 90° (bit 0) | I | No | 0° | 50% | 50% | n/a |
| | | II | No | 90° | 100% | 0% | 0 |
| | | I | Yes | 180° | 50% | 50% | n/a |
| | | II | Yes | 270° | 100% | 0% | 0 |
| | 270° (bit 1) | I | No | 0° | 50% | 50% | n/a |
| | | II | No | 90° | 0% | 100% | 1 |
| | | I | Yes | 180° | 50% | 50% | n/a |
| | | II | Yes | 270° | 100% | 0% | 1 |

Figure 5

| Alice Encoding | | Bob Decoding | Detector A | Detector B | Agreed Bit |
|---|---|---|---|---|---|
| Sifting basis III (non-orthogonal) | 0° (bit 0) | 0° | 100% | 0% | n/a |
| | | 90° | 50% | 50% | Bit 0 if Detector B clicks |
| | | 180° | 0% | 100% | n/a |
| | | 270° | 50% | 50% | Bit 0 if Detector A clicks |
| | 270° (bit 1) | 0° | 50% | 50% | Bit 1 if Detector B clicks |
| | | 90° | 0% | 100% | n/a |
| | | 180° | 50% | 50% | Bit 1 if Detector A clicks |
| | | 270° | 100% | 0% | n/a |
| Sifting basis IV (non-orthogonal) | 90° (bit 0) | 0° | 50% | 50% | Bit 0 if Detector A clicks |
| | | 90° | 100% | 0% | n/a |
| | | 180° | 50% | 50% | Bit 0 if Detector B Clicks |
| | | 270° | 100% | 0% | n/a |
| | 180° (bit 1) | 0° | 0% | 100% | n/a |
| | | 90° | 50% | 50% | Bit 1 if Detector B Clicks |
| | | 180° | 100% | 0% | n/a |
| | | 270° | 50% | 50% | Bit 1 if Detector A Clicks |

Figure 7

| Alice Encoding | | Bob | | | Detector A | Detector B | Agreed Bit Value |
|---|---|---|---|---|---|---|---|
| Basis I | 0° | Basis | Inversion | Phase | | | |
| | | I | No | 0° | 100% | 0% | 0 |
| | | II | No | 60° | 50% | 50% | n/a |
| | | III | No | 120° | 50% | 50% | n/a |
| | | I | Yes | 180° | 0% | 100% | 0 |
| | | II | Yes | 240° | 50% | 50% | n/a |
| | | III | Yes | 300° | 50% | 50% | n/a |
| | 180° | I | No | 0° | 0% | 100% | 1 |
| | | II | No | 60° | 50% | 50% | n/a |
| | | III | No | 120° | 50% | 50% | n/a |
| | | I | Yes | 180° | 100% | 0% | 1 |
| | | II | Yes | 240° | 50% | 50% | n/a |
| | | III | Yes | 300° | 50% | 50% | n/a |
| Basis II | 60° | I | No | 0° | 100% | 0% | 0 |
| | | II | No | 60° | 50% | 50% | n/a |
| | | III | Yes | 180° | 50% | 50% | n/a |
| | | I | Yes | 240° | 0% | 100% | 0 |
| | | II | Yes | 300° | 50% | 50% | n/a |
| | | III | No | 60° | 50% | 50% | n/a |
| | 240° | I | No | 120° | 50% | 50% | n/a |
| | | II | Yes | 180° | 0% | 100% | 1 |
| | | III | Yes | 240° | 50% | 50% | n/a |
| | | I | Yes | 300° | 50% | 50% | n/a |
| | | II | No | 0° | 50% | 50% | n/a |
| | | III | No | 60° | 100% | 0% | 1 |
| Basis III | 120° | I | No | 120° | 50% | 50% | n/a |
| | | II | No | 180° | 50% | 50% | n/a |
| | | III | No | 120° | 100% | 0% | 0 |
| | | I | Yes | 240° | 50% | 50% | n/a |
| | | II | Yes | 300° | 0% | 100% | 0 |
| | 300° | I | No | 0° | 0% | 100% | 1 |
| | | II | No | 60° | 50% | 50% | n/a |
| | | III | No | 120° | 50% | 50% | n/a |
| | | I | Yes | 180° | 50% | 50% | n/a |
| | | II | Yes | 240° | 50% | 50% | n/a |
| | | III | Yes | 300° | 100% | 0% | 1 |

Figure 10

| Alice Polarisation Rotator | | Bob Polarisation Rotator | | | Detector A | Detector B | Agreed Bit Value |
|---|---|---|---|---|---|---|---|
| | | Basis | Inversion | Angle | | | |
| Basis I | 0° | I | No | 0° | 100% | 0% | 0 |
| | | II | No | 45° | 50% | 50% | n/a |
| | | I | Yes | 90° | 0% | 100% | 0 |
| | | II | Yes | 135° | 50% | 50% | n/a |
| | 90° | I | No | 0° | 0% | 100% | 1 |
| | | II | No | 45° | 50% | 50% | n/a |
| | | I | Yes | 90° | 100% | 0% | 1 |
| | | II | Yes | 135° | 50% | 50% | n/a |
| Basis II | 45° | I | No | 0° | 50% | 50% | n/a |
| | | II | No | 45° | 100% | 0% | 0 |
| | | I | Yes | 90° | 50% | 50% | n/a |
| | | II | Yes | 135° | 100% | 0% | 0 |
| | 135° | I | No | 0° | 50% | 50% | n/a |
| | | II | No | 45° | 0% | 100% | 1 |
| | | I | Yes | 90° | 50% | 50% | n/a |
| | | II | Yes | 135° | 100% | 0% | 1 |

Figure 12

| Alice Phase Modulation | | Bob Phase Modulation | | | | Detector A | Detector B | Agreed Bit Value |
|---|---|---|---|---|---|---|---|---|
| Encoding | Authentication | Basis | Inversion | Encoding | Authentication | | | |
| Basis I 0° | Δφ | I | No | 0° | Δφ | 100% | 0% | 0 |
| | | II | No | 90° | Δφ | 50% | 50% | n/a |
| | | I | Yes | 180° | Δφ | 0% | 100% | 0 |
| | | II | Yes | 270° | Δφ | 50% | 50% | n/a |
| 180° | Δφ | I | No | 0° | Δφ | 0% | 100% | 1 |
| | | II | No | 90° | Δφ | 50% | 50% | n/a |
| | | I | Yes | 180° | Δφ | 100% | 0% | 1 |
| | | II | Yes | 270° | Δφ | 50% | 50% | n/a |
| Basis II 90° | Δφ | I | No | 0° | Δφ | 50% | 50% | n/a |
| | | II | No | 90° | Δφ | 0% | 100% | 0 |
| | | I | Yes | 180° | Δφ | 50% | 50% | n/a |
| | | II | Yes | 270° | Δφ | 100% | 0% | 0 |
| 270° | Δφ | I | No | 0° | Δφ | 50% | 50% | n/a |
| | | II | No | 90° | Δφ | 100% | 0% | 1 |
| | | I | Yes | 180° | Δφ | 50% | 50% | n/a |
| | | II | Yes | 270° | Δφ | 0% | 100% | 1 |

$\Delta\phi = \Delta\phi_1, \Delta\phi_2, \ldots \Delta\phi_N, (N \geq 2)$

Figure 15

QUANTUM COMMUNICATION SYSTEM

BACKGROUND OF THE INVENTION

1. Field of the Invention

The present invention relates to the field of quantum communication systems. More specifically, the present invention relates to decoders for quantum communication systems and a decoding method for quantum communication systems.

2. Discussion of the Background

There is often a need to communicate a message in secret over a channel which can potentially be intercepted by an eavesdropper. Traditionally, such a problem has been addressed by encrypting or enciphering the message using a secret key. Quantum communication provides a highly secure method for sending such a key. By encoding the key on a series of single photons, where each photon carries 1 bit of information encoded as quantum state of the photon e.g. polarisation, phase or energy/time of the photon, an eavesdropper cannot intercept the key without at least partially changing the key. It is not possible to completely prevent an eavesdropper from obtaining the key, but he or she will be detected.

A common protocol for distributing a secret key using single photons or weak coherent pulses is known as BB84 (Bennett et al. Proceedings of the IEEE International Conference on Computers, Systems and Signal Processing, Bangalore, India (IEEE, New York 1984) p 175).

In BB84, the bit state 0 or 1 is encoded onto a certain physical property of a photon, such as polarisation or phase delay in an interferometer. Each bit (1 or 0) may be represented using two orthogonal states in one of two non-orthogonal bases. One of the states in each basis codes for 0, the other codes for 1. For example, for phase encoding, the first basis may be defined by applying a phase shift of 0° or 180° to a photon passing through an interferometer, whereas the second basis may be defined by applying a phase shift of 90° or 270° to a photon passing through an interferometer. In the BB84 protocol the assignment of bit values to particular qubit states is agreed in advance and fixed. For polarisation encoding, one basis may be defined by vertically or horizontally polarising a photon and the other basis is defined by two polarisation states at 45° to the vertical and horizontal states.

The remainder of the discussion will concentrate on phase encoding, but the same principles apply to polarisation encoding. The phase state for each photon transmitted from sender (often referred to as Alice) to receiver (referred to as Bob) is chosen to be in one of the four states. These four states correspond to 0 and 1 in the two non-orthogonal encoding bases. Alice chooses at random the bit value (0 or 1) and the encoding basis for each photon and transmits the appropriate state to Bob. For each photon, Bob chooses at random in which basis to measure.

If Bob chooses for a particular photon, the same basis for his measurement as Alice used to encode, he will be able to measure the received state deterministically, or in other words with a theoretical accuracy of 100%. However, if he uses a different basis from Alice there is a finite probability that he will determine the wrong bit value. If the overlap integral between states in the two bases is 0.5 (ie if the bases are offset by 90° in the case of phase encoding), and Bob chooses a different basis to Alice, he has only a 50% chance of determining the correct result and a 50% chance of error.

After the measurement has been made, Alice and Bob communicate with one another over a classical channel. In the BB84 protocol, Alice and Bob compare the encoding and measurement bases that they have used and agree only to keep the results when they have used the same bases, a process known as sifting. The results from any measurements performed using an incorrect basis are discarded. This means that, typically, the results from half of the measured photons will be discarded.

A malicious eavesdropper, Eve listening into Alice and Bob's communication, could intercept some or all of the photons. Like Bob, she will not know which basis to use to measure the photons encoded by Alice. For the sake of simplicity we shall assume that Eve makes a random choice of measurement bases for each photon. Thus, if we assume that Alice encodes in the two bases with equal frequency, Eve will, on average, select the correct basis half of the time.

If Eve chooses a measurement basis which is non-orthogonal to Alice's encoding basis, her measurement will unavoidably alter the state of the photon from that encoded by Alice. In practice Eve's measurement will destroy the photon and she will therefore have to generate another photon for transmission to Bob. If Eve measures in the wrong basis, she will regenerate this photon in a different phase state from that originally prepared by Alice.

On average, Eve will guess an incorrect basis, and will thus alter the encoded state of the photon, with a probability of 0.5. This will result in a ~25% error rate in Bob's measurement results on average. Alice and Bob can therefore test if Eve has intercepted their communication by monitoring the error rate in their shared bit sequence. This they can do by comparing a subset of their shared bit sequence, selected from the bit sequence at random.

The security of the BB84 protocol has been proven theoretically on the assumptions that (i) information of which detector detects a photon is not accessible to Eve, and (ii) the two single photon detectors have same characteristics, for example, detection efficiency and dark count rate. Any violation of the above assumption may cause security compromise in quantum communication systems.

In reality, the assumptions above are rarely the case. First, Eve may be able to obtain information about the key by using so-called "side-channel" information. Generally, in quantum communication systems, the detectors used are avalanche photodiodes which amplify the single photon received using an avalanche process. This avalanche process also causes light emission from the device. Thus, a non-authorised person watching the detectors can tell which detector flashed and hence the bit value Bob will allocate to the detected photon. Thus, if Eve can determine which detector flashed and obtain information about which results are kept by intercepting the classical channel, she is able to obtain all of the key without generating any errors in the key and thereby remaining hidden.

Second, it is difficult in practice to have identical photon detectors for a quantum communication system. It is widely known that single photon detection efficiency of InGaAs avalanche photodiodes varies from 5% to 20%, and detector dark count rate can varies in a few orders of magnitude. Imbalance between the detectors can cause serious security compromise. The imbalance leads to the formation of keys which are biased in their frequency of bit=0 or bit=1, due to the difference in the efficiencies of the two detectors and a fixed bit assignment to each photon detector. This will impair the randomness of the key, and thereby degrade the security as the key is chosen from a reduced set of possible values. Moreover, there is no theoretical security proof of BB84 protocol with two un-identical photon detectors.

In a case of extreme unbalance in detection efficiency, ie., one detector is completely dead, the BB84 will be unable to form any secure key at all. Bit sequence formed between Alice and Bob will be uniquely all zeros or ones. The system with BB84 is not fault-tolerant.

BB84 protocol does not allow efficient use of avalanche photodiode based single photon detectors. The avalanche process generates a large number of charge carriers within the diode forming an easily detectable current. Some of these carriers may be localised at hetero-junctions or at trap states within the semiconductor. Carriers confined in such traps can have a lifetime of up to several microseconds. If the diode is biased above the avalanche breakdown threshold, before the trapped carriers have decayed, there is a possibility that a trapped carrier could be released and then trigger another avalanche. The resultant spurious signal is called an 'afterpulse'. To minimising the rate of afterpulse counts, the APD has to be biased inactive for a sufficiently long time to allow most of the trapped charge to decay. This is usually achieved by using clock-blanking circuitry which removes a number of following APD biasing gates after a photon detection event. In BB84 protocol, both of detectors have to be biased inactive for a long time after photon detection from either photon detector. Otherwise, correlation of bit values can be formed in the final key, which leaks information to Eve.

BB84 protocol is vulnerable to photon number splitting attacks by a malicious Eavesdropper. The photon number splitting attack is one of the most efficient attacks on weak pulse quantum key distribution systems. This vulnerability exists because an attenuated laser will inevitably produce some pulses containing more than one photon. Multi-photon pulses emitted by Alice can allow Eve to gain information about Alice-Bob's shared key without introducing any errors to the key and thereby remaining allowing her to remain hidden.

In the photon number splitting attack, Eve removes and stores one or more photon from each multiphoton pulse and passes the remainder of the pulse to Bob. She can then measure the stored photon after Alice-Bob reveal their encoding bases, and thereby gaining full information from that pulse without causing an error in Alice-Bob's shared key. This type of attack is particularly dangerous for systems which use an attenuated laser as the signal source. To achieve more secure communication, the contribution of the multiphoton pulses to Alice-Bob's shared key can be removed through privacy amplification.

SUMMARY OF THE INVENTION

The present invention attempts to address the above problems and in a first aspect provides a measuring unit for determining information from an input signal, the unit comprising a decoder configured to perform a measurement on said input signal using two operators, a first operator configured to distinguish between two orthogonal states of said input signal and a second operator selected from an inverting operator configured to invert the result of the measurement by the first operator and a null operator configured to have a null effect on the result of the measurement by the first operator.

By providing a decoder which has an inversion function it is possible to randomly invert the output of the decoder, thus enhancing security by preventing anyone from obtaining information by observing the output of the decoder and allows problems due to non-symmetry of the decoder to be nullified. Being able to switch the allocated bit value of a single detector means that protocols like the BB84 protocol can be implemented by using a single detector. Therefore, the system can be more robust and fault-tolerant.

Detection inversion means allows only the detector that registered a photon count to be biased inactive for a certain period of time to suppress detector afterpulse, and therefore makes efficient use of detectors.

In phase encoding of the BB84 protocol for quantum key distribution, Alice encodes each pulse with one of four phase delays: 0°, 90°, 180°, and 270° by setting her phase modulator to one of four corresponding voltages. There are six possibilities to group these encoding states to encoding sets: {0°, 90°}, {0°, 180°}, {0°, 270°}, {90°, 180°}, {90°, 270°}, and {180°, 270°}. Four-state BB84 protocol uses only the two encoding sets {0°, 180°} and {90°, 270°}, within which the two states are orthogonal. The receiver can perform a deterministic measurement on a state if he chooses a compatible measurement basis. From now on, we refer encoding sets consisting of two orthogonal states as orthogonal encoding sets. Accordingly, we call encoding sets consisting of two non-orthogonal states non-orthogonal encoding sets.

On the receiver's side, Bob can modulate his phase modulator to four different phase delays: 0°, 90°, 180°, and 270°. Phase delay difference 180° directs a photon to an opposite detector than that for a phase delay of 0°. In BB84 protocol, Bob uses 0° and 90° phase delays to decode photons sent by Alice. Decoding using BB84 is asymmetrical, because photons of each encoding state do not have equal probability of arriving at Bob's two detectors. With extra phase delay of 180°, Bob can switch a photon to an opposite detector. Bob randomly selects whether or not to apply such detection inversion means, so that photons arrive at two detectors with equal probabilities. Therefore, decoding with detection inversion means is inherently symmetrical.

By using non-orthogonal encoding sets, the system can be made resistant to pulse number splitting attack.

The decoder is primarily intended for use in performing a quantum measurement. For example, the decoder may comprise an interferometer and is configured to apply phase shifts as said first and second operators or the decoder may comprise a polarisation rotator and is configured to apply polarisation rotations as said first and second operators.

In the types of decoders used in the first aspect of the invention, there are generally first and second outputs each connected to a separate detector. Thus, by using the inversion operator, the roles and "bit values" assigned to the two detectors may be reversed. As the bit values may be reversed, it is possible to use just a single detector connected to one output as the role of this detector can be varied for each measurement.

In a second aspect, the present invention provides a quantum communication system comprising a sending unit and a receiving unit, said receiving unit comprising measuring unit in accordance with the first aspect of the present invention, said sending unit comprising an encoder configured to encode carriers setting quantum states of the carriers.

The encoder is configured to set the quantum states of the carriers to be one of at least four states, the encoder comprising means to assign or group pairs of states into said encoding sets. The encoding sets may be orthogonal or non-orthogonal. Two or more encoding sets may be used. The first operator may be chosen in accordance with any of the known protocols such as BB84 or the multiple basis protocol of GB 2368502. This principle may be applied to quantum information encoded upon higher dimensional Hilbert spaces.

The sending unit may also comprise means to vary the intensity of photon pulses which are used as carriers. This allows photons to be sent with two different intensities and hence lower intensity data pulses and higher intensity reference pulses may be sent In a third aspect, the present invention provides a quantum communication method comprising:

sending an input signal having quantum information encoded on said input signal in the form of one of at least four quantum states;

measuring said carriers using a decoder configured to perform a measurement on said input signal using two operators, a first operator configured to distinguish between two orthogonal states of said input signal and a second operator selected from an inverting operator configured to invert the result of the measurement by the first operator and a null operator configured to have a null effect on the result of the measurement by the first operator.

BRIEF DESCRIPTION OF THE DRAWINGS

The present invention will now be described with reference to the following non-limiting embodiments in which:

FIG. 5 is a table illustrating a communication protocol in accordance with an embodiment of the present invention based on orthogonal encoding sets;

FIG. 7 is a table illustrating an encoding method in accordance with the present invention based on a protocol using non-orthogonal encoding sets;

FIG. 10 is a table illustrating an encoding method in accordance with the present invention based on 6-states protocol with orthogonal encoding sets;

FIG. 12 is a table illustrating an encoding method in accordance with the present invention using polarisation encoding based on the known BB84 protocol;

FIG. 15 is a table illustrating an encoding method in accordance with a further embodiment of the present invention.

DETAILED DESCRIPTION OF THE PREFERRED EMBODIMENTS

Figure 1:
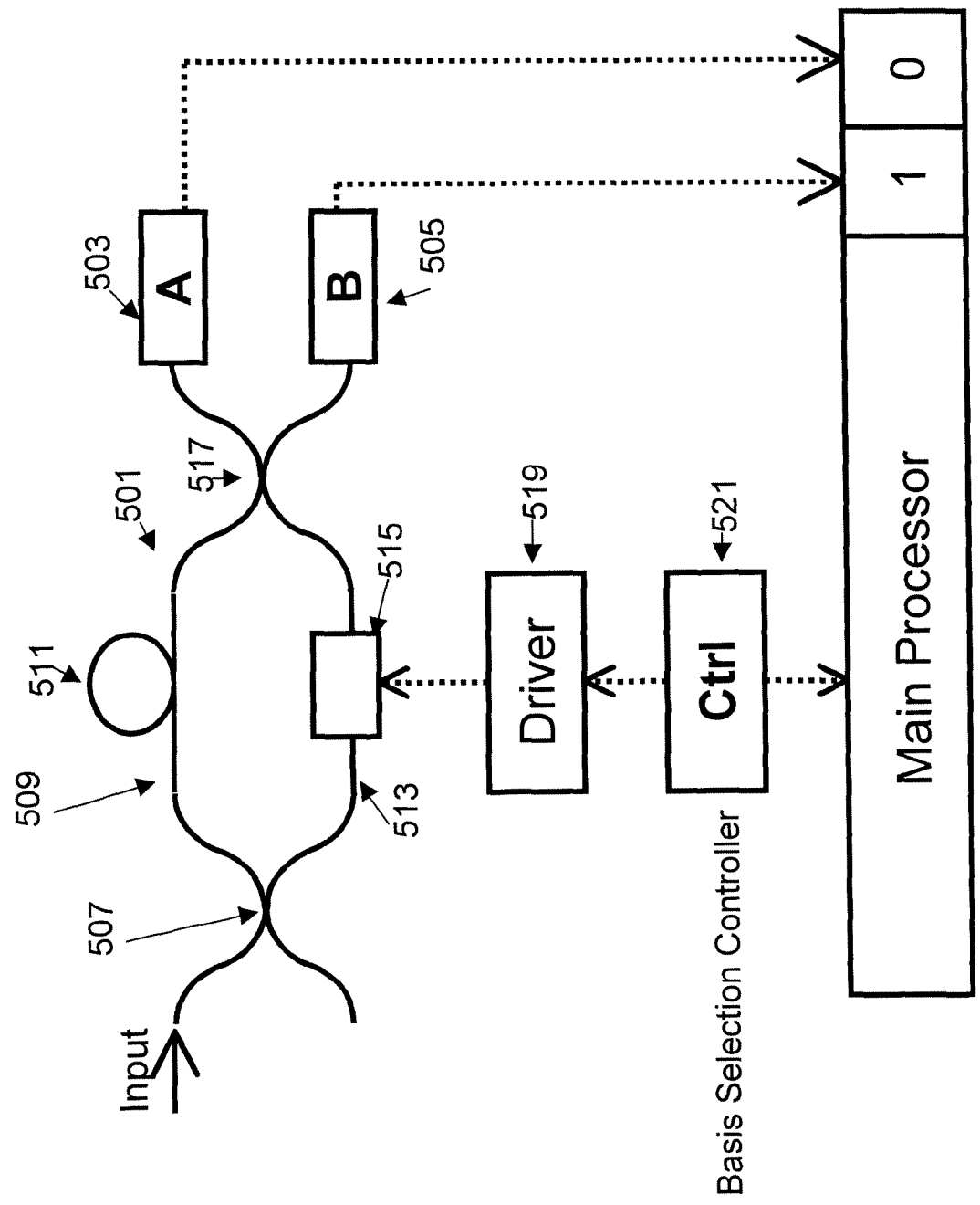
FIG. 1 is a schematic of a decoder for a quantum communication system using phase encoding.

FIG. 1 schematically illustrates the known apparatus for use in a decoder of a quantum communication system. The apparatus basically comprises an interferometer 501 and first detector 503A connected to a first output of the interferometer 501 and a second detector 505B connected to a second output of the interferometer 501. The interferometer 501 comprises an entrance coupler 507, one exit arm of entrance coupler 507 is joined to long arm 509, long arm 509 comprises a loop of fibre 511 designed to cause an optical delay, the other exit arm of entrance coupler 507 is joined to short arm 513, short arm 513 comprises a phase modulator 515, a beam coupler 517 is connected to the distal ends of long arm 509 and short arm 513.

One output of coupler 517 is connected to detector 503A and the other output of coupler 517 is connected to detector 505B.

Phase modulator 515 operates under the control of driver 519. Driver 519 applies a voltage to the phase modulator 515 which allows a phase delay to be applied to photons passing through the short arm 513 of the interferometer 501.

In this example, driver 519 receives an input from single basis selection controller 521. Basis selection controller 521 is configured to apply a control signal which allows the interferometer to distinguish between orthogonal states.

Generally, the type of decoder shown in FIG. 1 will be used to distinguish between orthogonal states. For example, in the BB84 protocol, two states representing bit 0 and 1 in an encoding set are orthogonal to each other. With a compatible measurement basis set by the phase modulator 515, the receiver can determine the incoming quantum state by quantum interference at the coupler 517. The constructive inference occurs when the incoming state is encoded to represent bit 0, and in this case photon detector 503A will register a photon count. The destructive inference happens when the incoming state is encoded to represent bit 1, and the photon detector 505B will register a photon count. The detail of how the decoder 501 will be operated in a quantum communication system will be described with reference to FIG. 3.

Generally, in the BB84 protocol, a photon count at detector A 503 always corresponds to a bit value of 0 and one at detector B 505 always corresponds to a bit value of 1.

Figure 2:
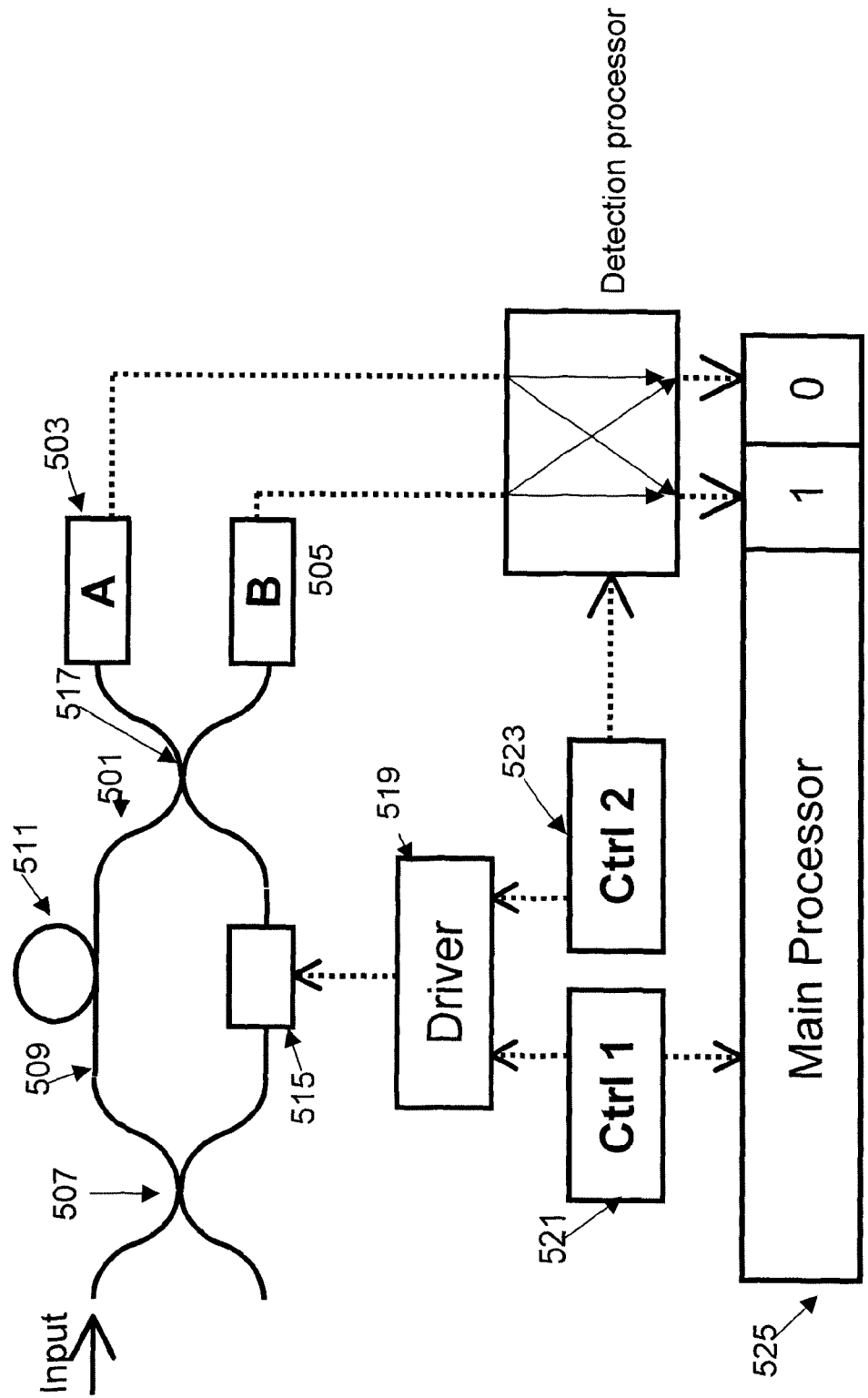
FIG. 2 is a schematic of a decoder in accordance with an embodiment of the present invention.

FIG. 2 shows an apparatus in accordance with a preferred embodiment of the present invention. To avoid unnecessary repetition, like reference numerals will be used to disclose like features. The interferometer 501 remains identical to that described with reference to FIG. 1. Also, the phase modulator 501 is controlled by driver 519. However, in addition to basis selection controller 521, a further controller 523 is provided. Controller 523 is an inversion controller. The main processor 525 will instruct basis selection controller 521 to operate in the same manner as described with reference to FIG. 1. However, inversion controller 523 will then be operated in order to apply a further phase shift via a phase modulator 515. The inverting phase shift will either be 0° (if no inversion is required) or 180°. If the phase shift of 180° is further applied by inversion controller 523, the situation described with reference to FIG. 1 can be reversed. The detection results by two detectors are passing through the detection processor. The detection processor inverses the detection results before the results are being registered by the main processor 525 if an inversion phase shift is used. The detection processor can also be integrated into the main processor or software-based.

Figure 3:
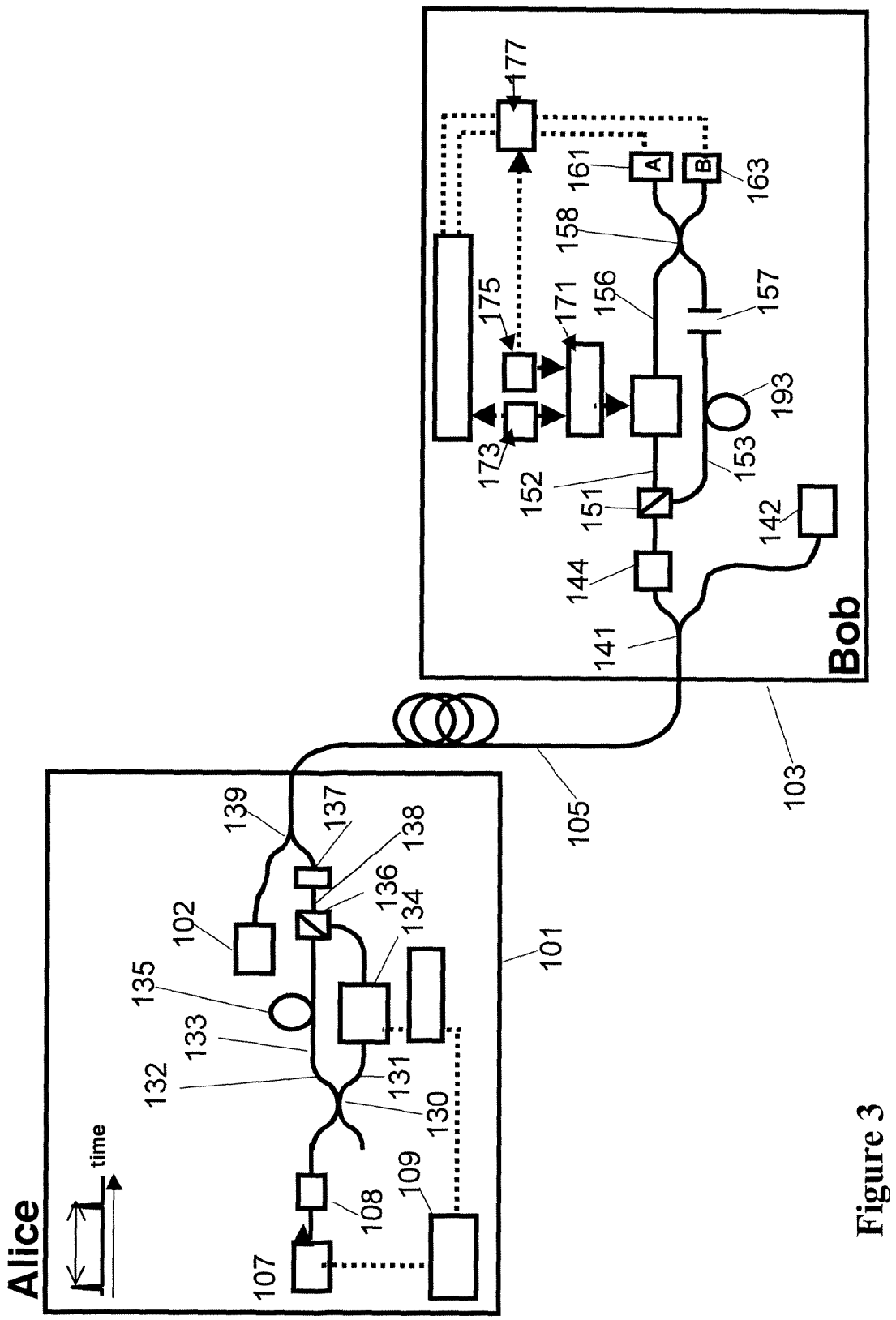
FIG. 3 schematically illustrates a quantum communication system using phase encoding in accordance with an embodiment of the present invention.

FIG. 3 shows a quantum cryptography system based upon phase encoding using a polarisation sensitive fibre interferometer in accordance with an embodiment of the present invention.

The sender "Alice" 101 sends encoded photons to receiver "Bob" over optical fibre 105.

Alice's equipment 101 comprises a signal laser diode 107, a polarisation rotator 108 configured to rotate the polarisation of pulses from signal laser diode 107, an imbalanced fibre Mach-Zender interferometer 133 connected to the output of polarisation rotator 108, an attenuator 137 connected to the output of the interferometer 133, a bright clock laser 102, a wavelength division multiplexing (WDM) coupler 139 coupling the output from attenuator 137 and clock laser 102 and bias electronics 109 connected to said signal laser diode 107 and clock laser 102.

The interferometer 133 comprises an entrance coupler 130, one exit arm of entrance coupler 130 is joined to long arm 132, long arm 132 comprises a loop of fibre 135 designed to cause an optical delay, the other exit arm of entrance coupler 130 is joined to a short arm 131, short arm 131 comprises phase modulator 134 an exit polarising beam combiner 136 is connected to the other ends of long arm 132 and short arm 131. All components used in Alice's interferometer 133 are polarisation maintaining.

During each clock signal, the signal diode laser 107 outputs one optical pulse. The signal diode laser 107 is connected to biasing electronics 109 which instruct the signal diode laser 107 to output the optical pulse. The biasing electronics are also connected to clock laser 102.

The linear polarisation of the signal pulses outputted by diode laser 107 is rotated by a polarisation rotator 108 so that the polarisation of the pulse is aligned to be parallel to a particular axis of the polarisation maintaining fibre (usually the slow axis) of the entrance coupler 130 of the interferometer 133. Alternatively the polarisation rotator 108 may be omitted by rotating the signal laser diode 107 with respect to the axes of the entrance polarisation maintaining fibre coupler 130.

After passing through the polarisation from rotator (if present) the signal pulses are then fed into the imbalanced Mach-Zender interferometer 133 through a polarisation maintaining fibre coupler 130. Signal pulses are coupled into the same axis (usually the slow axis) of the polarisation maintaining fibre, of both output arms of the polarisation maintaining fibre coupler 130. One output arm of the fibre coupler 130 is connected to the long arm 132 of the interferometer while the other output arm of the coupler 130 is connected to the short arm 131 of the interferometer 133.

The long arm 132 of the interferometer 133 contains an optical fibre delay loop 135, while the short arm 131 contains a fibre optic phase modulator 134 which is configured to apply a phase shift of θ (where θ=0°, 90°, 180° or 270°). The fibre optic phase modulator 134 is connected through a phase modulator driver 120 to biasing electronics 109 which will be described in more detail later. The length difference of the two arms 131 and 132 corresponds to an optical propagation delay of $t_{delay}$. Typically the length of the delay loop 135 may be chosen to produce a delay $t_{delay} \sim 5$ ns. Thus, a photon travelling through the long arm 132 will lag that travelling through the short arm 131 by a time of $t_{delay}$ at the exit 136 of the interferometer 133.

The two arms 131, 132 are combined together with a polarisation beam combiner 136 into a single mode fibre 138. The fibre inputs of the polarisation beam combiner 136 are aligned in such a way that only photons propagating along particular axes of the polarisation maintaining fibre are output from the combiner 136. Typically, photons which propagate along the slow axis or the fast axis are output by combiner 136 into fibre 138.

The polarising beam combiner 136 has two input ports, an in-line input port and a 90° input port. One of the input ports is connected to the long arm 132 of the interferometer 133 and the other input port is connected to the short arm 131 of the interferometer 133.

In this example, only photons polarised along the slow axis of the in-line input fibre of the in-line input port are transmitted by the polarising beam combiner 136 and pass into the fibre 138. Photons polarised along the fast axis of the in-line input fibre of the input port are reflected and lost.

Meanwhile, at the 90° input port of the beam coupler 136, only photons polarised along the slow axis of the 90° input fibre are reflected by the beam combiner 136 and pass into the output port, while those polarised along the fast axis will be transmitted out of the beam combiner 136 and lost.

This means that the slow axis of one of the two input fibres is rotated by 90° relative to the output port. Alternatively the polarisation may be rotated using a polarisation rotator (not shown) before one of the input ports of the polarising beam combiner (136).

Thus, photon pulses which passed through the long 132 and short arms 131 will have orthogonal polarisations.

The signal pulses are then strongly attenuated by the attenuator 137 so that the average number of photons per signal pulse $\mu \ll 1$.

The signal pulses which are outputted by the combiner 136 into single mode fibre 138 are then multiplexed with a bright laser clock source 102 at a different wavelength using a WDM coupler 139. The multiplexed signal is then transmitted to the receiver Bob 103 along an optical fibre link 105. The biasing electronics 109 synchronises the output of the clock source 102 with the signal pulse.

Bob's equipment 103 comprises WDM coupler 141, a clock recovery unit 142 connected to an output of coupler 141, a polarisation controller 144 connected to the other output of WDM coupler 141, an imbalanced Mach-Zender interferometer 156 connected to the output of polarisation controller 144, two single photon detectors A 161, B 163 connected to the output arms of interferometer 156. Biasing electronics (not shown in FIG. 3) is used to bias all active components, including the detectors 161, 163. Bob's interferometer 156 contains an entrance polarising beam splitter 151 connected to both: a long arm 153 containing a delay loop 154 and a variable delay line 157; and a short arm 152 containing a phase modulator 155. The long arm 153 and short arm 152 are connected to an exit polarisation maintaining 50/50 fibre coupler 158. The phase modulator 155 is connected to a phase modulator driver 171. The phase modulator driver 171 is controlled by a first controller 173 and an inversion controller 175 as described with reference to FIG. 2. All components in Bob's interferometer 156 are polarisation maintaining. The detectors 161, 163 are connected to detection processor 177 to process detection results and the main processor 179. Detection processor 177 is connected to inversion controller 175 and receives instructions on whether or not to inverse the detection results for each photon detection event.

Bob first de-multiplexes the transmitted signal received from Alice 101 via fibre 105 using the WDM coupler 141. The bright clock laser 102 signal is routed to an optical receiver 142 to recover the clock signal for Bob 103 to synchronise with Alice 101.

The signal pulses which are separated from the clock pulses by WDM coupler 141 are fed into a polarisation controller 144 to restore the original polarisation of the signal pulses. This is done so that signal pulses which travelled the short arm 131 in Alice's interferometer 133, will pass the long arm 153 in Bob's interferometer 156. Similarly, signal pulses which travelled through the long arm 132 of Alice's interferometer 133 will travel through the short arm 152 of Bob's interferometer.

The signal then passes through Bob's interferometer 156. An entrance polarising beam splitter 151 divides the incident pulses with orthogonal linear polarisations. The two outputs of the entrance polarisation beam splitter 151 are aligned such that the two output polarisations are both coupled into a particular axis, usually the slow axis, of the polarisation maintaining fibre. This ensures that signal pulses taking either arm will have the same polarisation at the exit 50/50 polarisation maintaining coupler 158. The long arm 153 of Bob's interferometer 156 contains an optical fibre delay loop 154 and a variable fibre delay line 157, and the short arm 152 contains a phase modulator 155 which is configured to apply a phase shift of θ. The two arms 152, 153 are connected to a 50/50 polarisation maintaining fibre coupler 158 with a single photon detector A 161, B 163 attached to each output arm.

Due to the use of polarising components, there are, in ideal cases, only two routes for a signal pulse travelling from the entrance of Alice's interferometer to the exit of Bob's interferometer:

i. Alice's Long Arm 132—Bob's Short Arm 152 (L-S) and
ii. Alice's Short Arm 131—Bob's Long Arm 153 (S-L).

The variable delay line 157 at Bob's interferometer 156 is adjusted to make the propagation time along routes (i) and (ii) almost equal, within the signal laser coherence time which is typically a few picoseconds for a semiconductor distributed feed back (DFB) laser diode, and thereby ensure interference of the two paths. Bob achieves this by adjusting the variable fibre delay line 157 prior to key transfer.

By controlling the voltages applied to their phase modulators 134, 155, Alice and Bob determine in tandem whether paths (i) and (ii) undergo constructive or destructive interference at detectors A 161 and B 163. The phase modulators 134, 155 are connected to respective biasing means 109 and 143 to ensure synchronisation.

The variable delay line 157 can be set such that there is constructive interference at detector A 161 (and thus destructive interference at detector B 163) for zero phase difference between Alice and Bob's phase modulators. Thus for zero phase difference between Alice's and Bob's modulators and for a perfect interferometer with 100% visibility, there will be a negligible count rate at detector B 163 and a finite count rate at A 161.

If, on the other hand, the phase difference between Alice and Bob's modulators 134, 155 is 180°, there should be destructive interference at detector A 161 (and thus negligible count rate) and constructive at detector B 163. For any other phase difference between their two modulators, there will be a finite probability that a photon may output at detector A 161 or detector B 163.

By using the above apparatus, a key can be sent from Alice 101 to Bob 103. One of the protocols for sending information from Alice 101 to Bob 103 is the BB84 protocol. In the BB84 protocol Alice and Bob agree that Alice will use her emitter to send photons having one of four phase states. These phase states are defined by Alice using her phase modulator 134 to apply one of 4 different phase shifts θ, namely 0°, 90°, 180° or 270°. These phase states define two non-orthogonal encoding bases {0°, 180°} and {90°, 270°}. In this particular example, the basis are rotated by 90° from one another, the basis may be rotated by other angle providing that the bases are not oriented by 180° or an integer multiple of 180° from one another. There are two orthogonal encoding sets: the first set {0°, 180°} using the first encoding basis and the second set {90°, 270°} using the second basis.

Alice sends the photons to Bob using the quantum channel randomly selecting a state by randomly applying a phase shift of 0°, 90°, 180° or 270°.

Bob determines the phase of the received photons randomly varying his measuring basis between the two bases defined by Alice. Bob achieves this by operating his phase modulator 155 under the control of first controller 173. By applying a phase shift of 0°, Bob is measuring in the basis defined by Alice applying a phase shift of 0° or 180° and by applying a phase shift of 90°, Bob is measuring in the basis defined by Alice applying a phase shift of 90° or 270°.

However, Bob's interferometer is capable of applying an inversion phase shift of 180°. This inversion phase shift is controlled by the inversion controller 175. Thus, Bob randomly applies one of the phase shifts of 0°, 90°, 180° and 270°.

Figure 4:
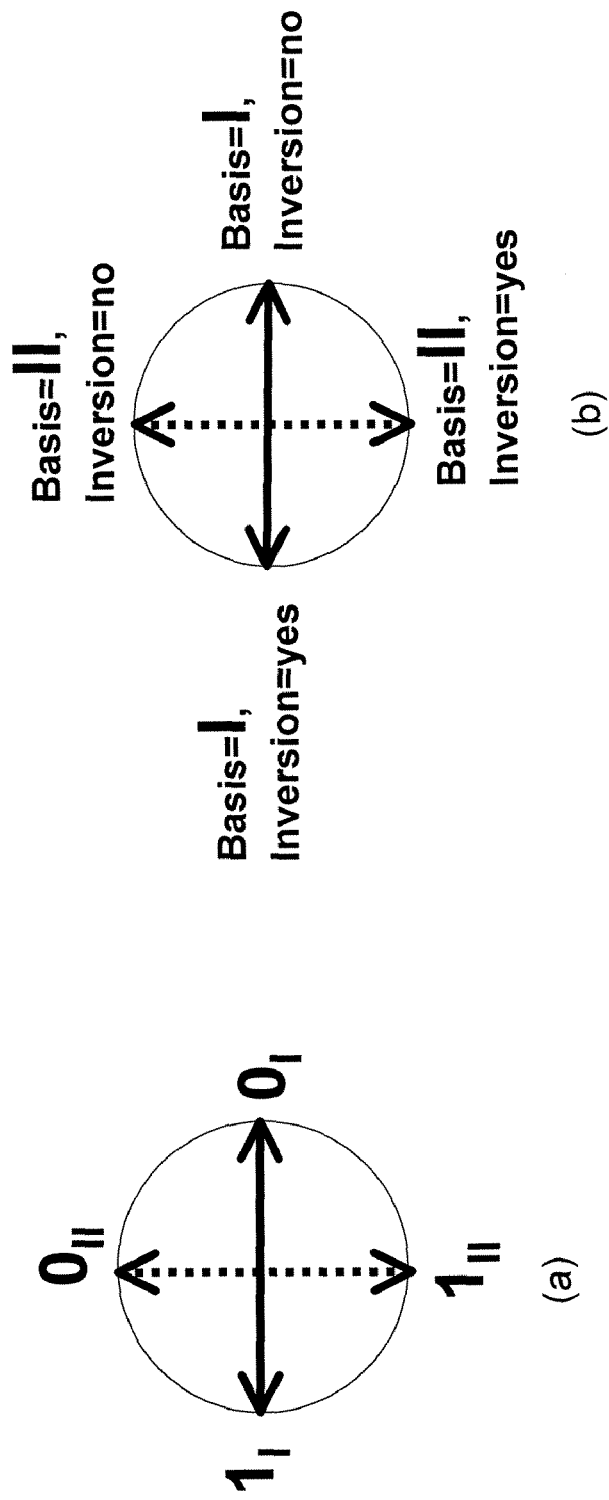
FIG. 4 illustrates phase modulator settings for a quantum communication system using phase encoding with the present invention based upon orthogonal encoding sets; (a) for the sending unit and (b) for the receiving unit.

FIG. 4 schematically indicates how the phase modulators may be set. FIG. 4a indicates the four states which may be applied using Alice's phase modulator. Alice may apply states using basis I or basis II. In basis I, Alice selects between a bit value of 0 (which corresponds to a phase shift 0° and a bit value of 1 (which corresponds to a phase shift of 180°). In basis II, she selects between a phase shift of 90° and a bit value of 0 or a phase shift of 270° and a bit value of 1.

FIG. 4b indicates Bob's modulator. Again Bob can select from four states, two states 0° and 90° respectively relating to basis I and basis II. However, using his inversion controller, he measures using basis I inverted (equivalent to a phase shift of 180°) or basis II inverted (equivalent to a phase shift of 270°) by using his inversion controller. Bob has to change the bit value assignment between the two detectors by using the detection processor 177 in order to compensate the detection inversion phase shift (extra 180°) applied.

FIG. 5 is a table showing how Alice and Bob use their modulators in the apparatus of FIG. 3 when using a communication method in accordance with an embodiment of the present invention which is based on the BB84 protocol.

As before, when sending photon pulses Alice's modulator applies a phase shift randomly chosen from 0°, 90°, 180° or 270°, these phase states define two orthogonal encoding sets {0° (bit 0), 180° (bit 1)} and {90° (bit 0), 270° (bit 1)}. Within each encoding set, two states are orthogonal.

When Bob receives the pulses he then applies a phase shift with his modulator 155 which is randomly selected from 0°, 90°, 180° or 270°. After measurements, Alice informs Bob which encoding set she uses to encode the photon. They agree to keep the result when Bob's measurement basis is compatible with Alice's encoding set. The key sifting agreement is shown in FIG. 5. Key generation efficiency of this agreement is 50%, the same as the BB84. Half of photon detection events are discarded due to incompatible measurement bases.

Different from the conventional BB84 protocol, Bob now has measurement basis which are orthogonal to each other. Using orthogonal measurement bases is a detection inversion means for deterministic measurements. For example, using 0° measurement basis directs a 0° state photon to detector A, while using 180° measurement basis directs a 0° state photon to detector B. Under the key sifting agreement shown in FIG. 5, both the detection results are agreed to the same bit value. Using orthogonal measurement bases does not change sifting results.

There are many advantages using the decoding scheme shown in FIG. 5 as compared to standard BB84 protocol.

First, the coding scheme improves randomness of keys formed over the conventional BB84 protocol. It is difficult in practice to have identical photon detectors for a quantum communication system. InGaAs avalanche photodiodes, used for single photon detections in fibre-optics based quantum communication systems, have varying detection efficiency typically from 5% to 20%, and detector dark count rate varying range of a few orders of magnitude. Imbalance between the detectors can cause serious security compromise in the conventional BB84 protocol. For example, the imbalance causes biased keys formed due to the difference in detection efficiencies as a result of constant bit assignment to a photon detector and therefore the randomness of the key formed will not be perfect.

Since orthogonal measurement bases are randomly chosen in this coding scheme, each photon state has equal probability of arriving at each detector. Each bit value can be assigned to either detector A or detector B. Thus, any bias in the detection efficiency will not result in biased keys.

Second, the coding scheme allows efficient use of photon detectors. Previously in BB84 protocol, after one detector fires, both detectors have to be biased inactive to avoid build-up of correlation of consecutive bits in the key. The detectors are not efficiently used. With the above coding scheme, detectors are no longer associated with a single bit value. Therefore, only the detector that fires needs to be biased inactive to avoid afterpulsing. In the high photon detection rate, the present coding scheme can potentially improves key generation rate by a factor of 2 as compared with conventional BB84 protocol.

Third, side channel information that exists for BB84 protocol is totally blocked in the present coding scheme. Eve is no longer able to interpret the detection results, as she does not know whether or not Bob uses the detection inversion of extra 180° phase shift for his measurement basis. In the new coding scheme, security is not affected even if Eve obtains a correct copy of all detection results.

Last, the present coding scheme allows single detector operation. Key generation efficiency is dropped to 25%, but perfectly random keys are still able to be generated with single detector. Ability of single detection operation greatly improves the fault-tolerance of the system.

In the above coding scheme, two states within each encoding set are orthogonal to each other, as shown in FIG. 5. The agreed bit value is based upon Bob's deterministic measurements. It is also feasible to use different encoding sets, for example, non-orthogonal encoding sets in which two states are non-orthogonal to each other. Further, with non-orthogonal encoding sets, agreed bit cannot be based upon deterministic measurements, but must be based upon Bob's probabilistic measurements.

Figure 6:
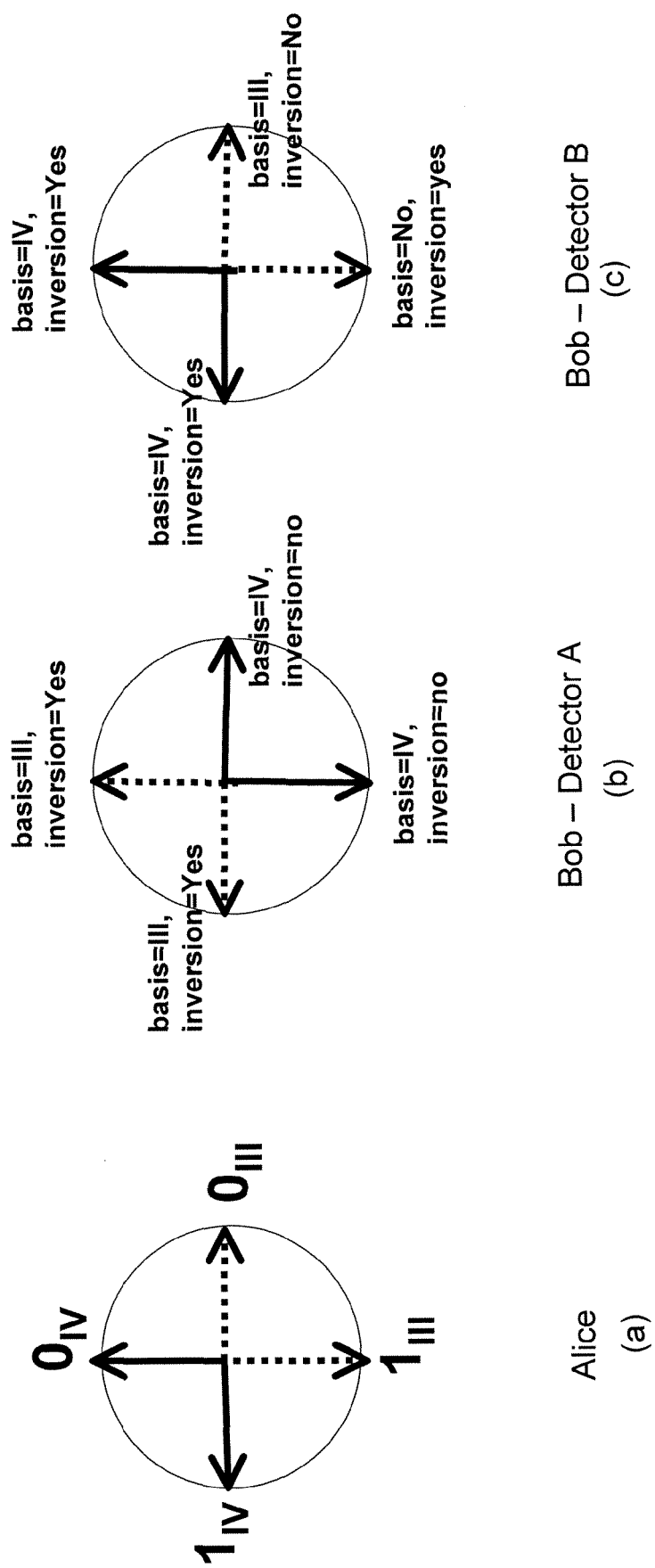
FIG. 6 illustrates phase modulator settings for a quantum communication system using phase encoding with the present invention based upon non-orthogonal encoding sets.

FIGS. 6 and 7 shows an example of sifting schemes using non-orthogonal encoding sets. Alice encodes her photons to one of four different phase delays: 0°, 90°, 180° and 270° and Bob decodes using four measurement bases: 0°, 90°, 180° and 270°. The encoding and decoding apparatus are the same as that of FIG. 3.

Sifting scheme in FIG. 6 is different from that of FIG. 4. Encoding sets are all orthogonal in FIG. 4, where two states within each encoding set are orthogonal to each other. However, in FIG. 6, two states representing bits 0 and 1 in each encoding set are non-orthogonal to each other. {0° (bit 0) and 270° (bit 1)} form one encoding set (III), while {90° (bit 0) and 180° (bit 1)} form the other encoding set (IV). As shown in FIGS. 6b and 6c, either of Bob's detector is used for sifting keys.

FIG. 7 is a table showing how Alice and Bob use their modulators in the apparatus of FIG. 3 when using a communication method in accordance with an embodiment of the present invention which is based on non-orthogonal encoding sets. As two states within each encoding set are not orthogonal to each other, Bob is no longer able to discriminate two states unambiguously. Key sifting therefore has to be based upon probabilistic measurements. Bob's measurement basis is chosen in such a way that he has 50% probability to identify the state Alice encoded but is able to exclude the other state with 100% accuracy.

For example, to identify 0° state in the encoding set {0°, 270°}, Bob's compatible measurement basis are either 90° or 270°. With either measurement basis, Bob can perform deterministic measurement on state {270°}, but only probabilistic measurement on state {0°}. When (i) a photon click at detector B and measurement basis 90° is used or (ii) a photon click at detector A and measurement basis 270° is used, Alice and Bob can agree a bit of 0.

The scheme using non-orthogonal encoding sets has the same advantages as orthogonal encoding sets. These include (i) ability to obtain perfectly random keys with biased detectors; (ii) efficient use of photon detectors—one detector is not affected by the photon detection event of the other; (iii) side-channel is blocked for Eve—Eve cannot obtain information by simply watching photon detectors; and (iv) ability to operate with single detector (key generation efficiency: 12.5%), which makes system more fault-tolerant. The only disadvantage is that key generation efficiency using non-orthogonal encoding sets is 25%, which is half of that uses orthogonal encoding sets.

However, there is extra benefit of using non-orthogonal encoding sets. Using non-orthogonal encoding sets is resistant to photon number splitting attack. This type of attack is highly suppressed by using non-orthogonal encoding sets, because Eve cannot perform a deterministic discrimination between two non-orthogonal states. She will have errors in her copy of keys even she is allowed to split and store a photon from each photon pulse.

Figure 8:
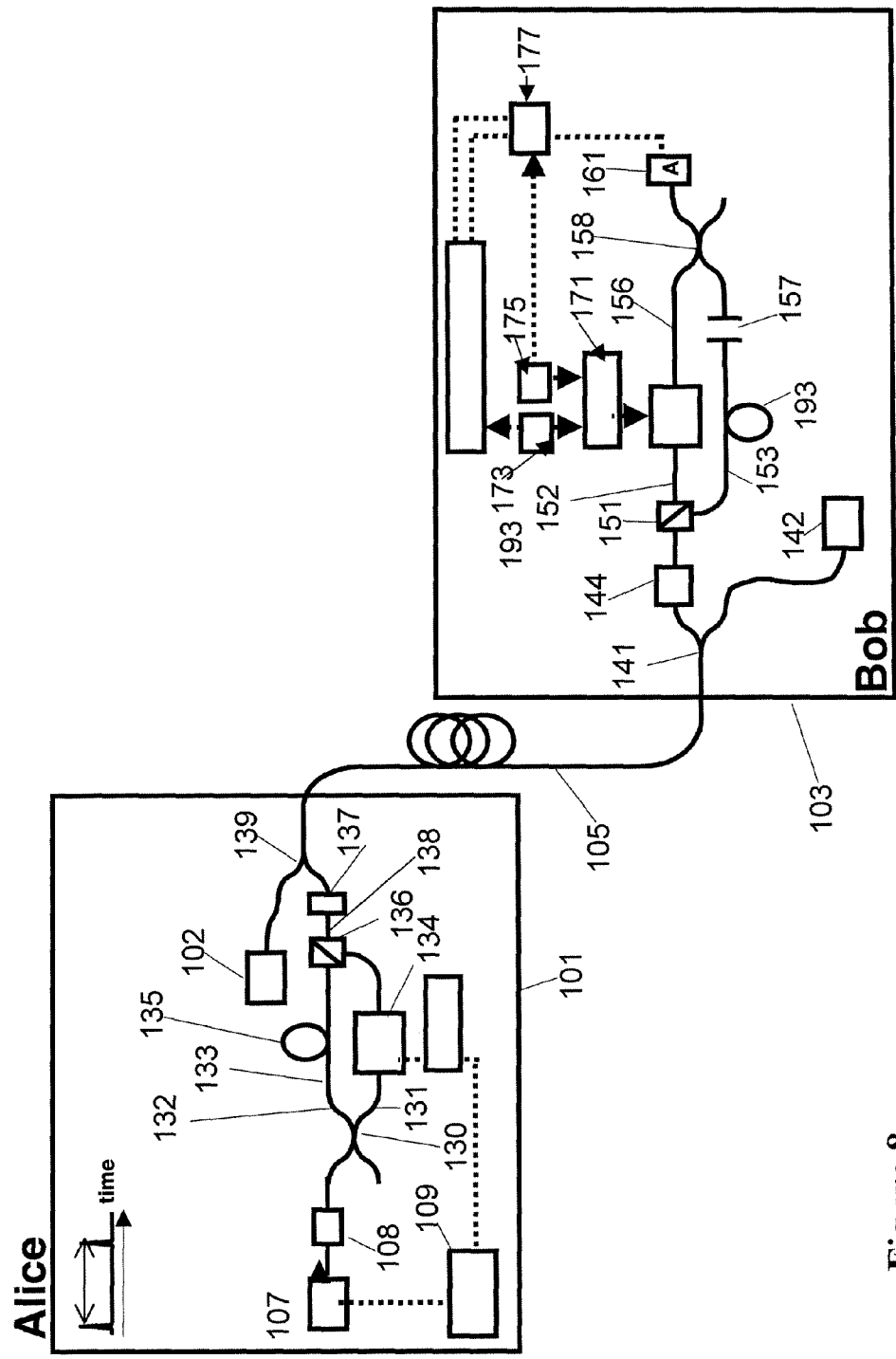
FIG. 8 schematically illustrates a quantum communication system using phase encoding in accordance with an embodiment of the present invention having a single detector.

As has been shown in FIGS. 2 to 7, the use of an inversion controller allows the roles of the two detectors to be swapped on a pass-by-pass basis. Thus, it is possible to design the system so that it only has one detector 161A. Such a system is shown in FIG. 8. Except for the single detector, the system remains identical to that described with reference to FIG. 3.

Figure 9:
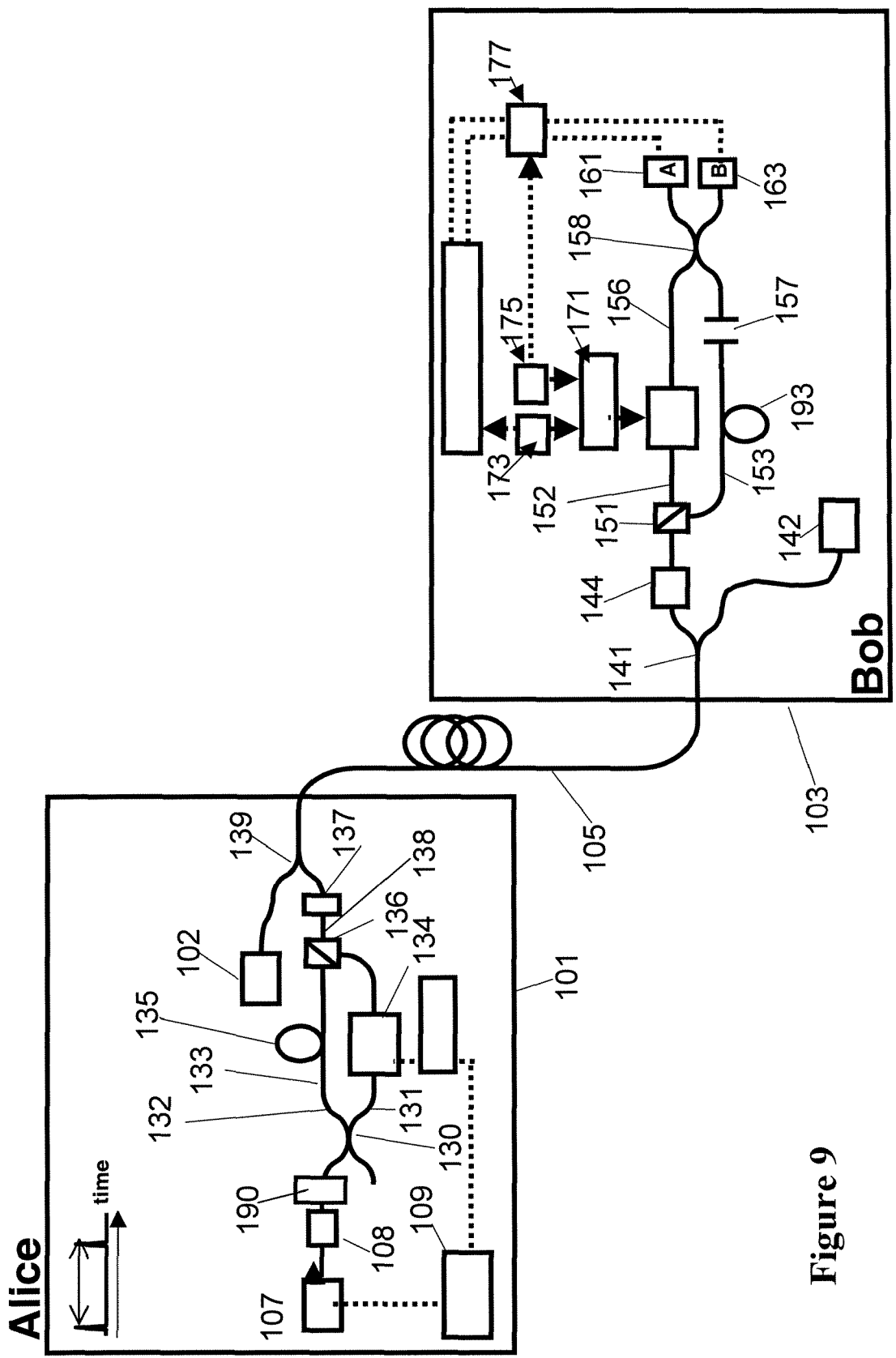
FIG. 9 schematically illustrates a quantum communication system using phase encoding in accordance with an embodiment of the present invention with an intensity modulator.

FIG. 9 schematically illustrates a quantum communication system using phase encoding in accordance with an embodiment of the present invention. Alice and Bob's equipment is similar to that described with reference to FIG. 3. To avoid unnecessary repetition, the same reference numerals are used as in FIG. 3. The only difference is that an intensity modulator 190 is added in FIG. 9. The intensity modulator allows some of the lower intensity data pulses to be substituted with higher intensity reference pulses. The reference pulses may be used to calibrate the communication system by adjusting delay lines etc.

Previously, the discussion has concentrated on the use of two encoding/sifting bases. However, three or more bases may be used.

A multiple basis protocol has been described in GB2 368 502, where Alice and/or Bob switch randomly between 3 or more non-orthogonal bases. This scheme has been proposed to counter attack Eve measuring using an intermediate basis. For example, if Alice and Bob are using the BB84 protocol exactly as described with reference to FIG. 1b, Eve may set her modulator to add a phase shift of 45°. For the reasons described in detail in GB2 368 502, Eve will introduce errors at the same rate as for conventional eavesdropping (25%). However, she gains more information about the key. With conventional eavesdropping, Eve has a key which has 75% of the bits statistically correct, To negate the effects of Eve measuring in an intermediate basis, Alice and Bob agree on three different bases to send the information say {0°, 180°}, {60°, 240°} and {120°, 300°}. As before for BB84, each basis has two orthogonal states and each basis is rotated by 60°. This additional basis increase Eve's error rate even if she uses two intermediate basis (one at 30° and one at 90°).

The BB84 protocol can be used in the same way as described with reference to FIG. 5, but this time when Alice and Bob compare basis there are three bases not just two.

FIG. 10 is a table showing how a method in accordance with a preferred embodiment of the present invention may be applied to a BB84 style protocol using multiple bases. Alice applies a phase shift selected from {0°, 180°}, {60°, 240°} and {120°, 300°}. Bob measures each pulse using his modulator which can apply a phase shift selected from {0°, 180°}, {60°, 240°} and {120°, 300°}.

Again, Bob controls which of his detectors corresponds to which bit-value and hence the analysis is the same as described in GB2 368 502 and shown in FIG. 10.

FIG. 10 list only the orthogonal encoding sets. Non-orthogonal encoding sets can also be used for 6-states protocol.

Although three bases have been used to describe a multiple basis method, four or more basis may also be used.

Figure 11:
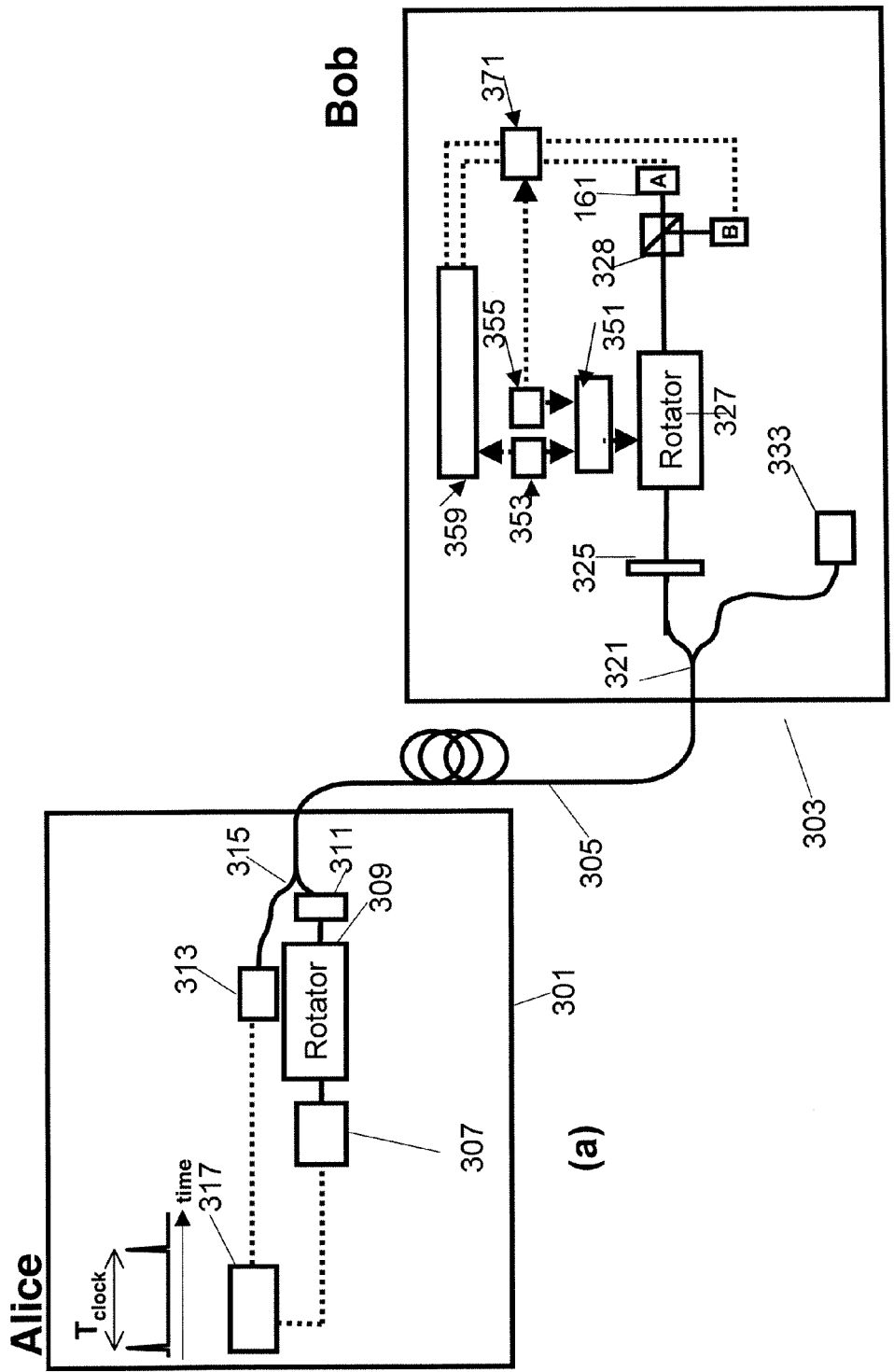
FIG. 11 schematically illustrates a quantum communication system using polarisation encoding in accordance with an embodiment of the present invention.

The method and apparatus of the present invention has been described with reference to phase encoding. However, it is also possible to use polarisation encoding with the present invention. FIG. 11 schematically illustrates an apparatus in accordance with an embodiment of the present invention which can perform polarisation encoding.

As for the phase encoding the sender Alice 301 sends encoded photons to receiver Bob 303 over optical fibre 305.

Alice's equipment 301 comprises a signal laser diode 307, a variable polarisation rotator 309 configured to rotate the polarisation of pulses from signal laser diode 307, an attenuator 311 connected to the output of polarisation rotator 309, a bright clock laser 313, a wavelength division multiplexing (WDM) coupler 315 coupling the output from attenuator 311 and clock laser 313 and bias electronics 317 connected to said signal laser diode 307 and clock laser 313.

During each clock signal, the signal diode laser 307 outputs one optical pulse. The signal diode laser 307 is connected to biasing electronics 317 which instruct the signal diode laser 307 to output the optical pulse. The biasing electronics are also connected to clock laser 313.

The linearly polarised signal pulses outputted by diode laser 307 are rotated by variable polarisation rotator 309. Variable polarisation rotator applies a rotation selected randomly from a rotation by angle 0°, 45°, 90° or 135°.

The signal pulses are then strongly attenuated by the attenuator 311 so that the average number of photons per signal pulse $\mu \ll 1$.

The signal pulses are then multiplexed with a bright laser clock source 313 at a different wavelength using a WDM coupler 315. The multiplexed signal is then transmitted to the receiver Bob 303 along an optical fibre link 305. The biasing electronics 317 synchronises the output of the clock source 313 with the signal pulse.

Bob's equipment 303 comprises WDM coupler 321, a clock recovery unit 333 connected to an output of coupler 321, a polarisation controller 325 connected to the other output of WDM coupler 321, a variable polarisation rotator 327 connected to the output of polarisation controller 325, a polarising beam splitter 328 connected to the output of polarisation rotator 327 and two single photon detectors A and B connected to the outputs of the polarising beam splitter 328 and the main processor 359 connected to the detectors A and B through detection processor 371 and the clock signal recovery unit 333.

All active components in Bob's setup are biased or synchronised by biasing electronics (not shown).

Bob first de-multiplexes the transmitted signal received from Alice 301 via fibre 305 using the WDM coupler 321. The bright clock laser 313 signal is routed to an optical receiver 333 to recover the clock signal for Bob 303 to synchronise with Alice 301.

The signal pulses which are separated from the clock pulses by WDM coupler 321 are fed into a polarisation controller 325 to restore the original polarisation of the signal pulses to correct for any rotation which has happened during transmission down fibre 305.

The signal then passes through Bob's variable polarisation rotator 327. The polarisation rotator 327 rotates the polarisation by 0°, 45°, 90° or 135°. Bob's polarisation rotator 327 operates under the control of polarisation driver 351. Polarisation driver 351 is in turn controlled by two controllers, a first controller 353, which selects randomly its measurement basis e.g. 0° or 45° and an inversion controller 355 which randomly adds a 0° or 90° phase shift to essentially change the bit value allocated to either detector A or B.

The pulses are then passed into polarising beam splitter 328 which passes vertically polarised pulses to detector A and horizontally polarised pulses to detector B. If the pulses reaching polarising beam splitter 328 are not horizontally or vertically polarised, they may be directed to either detector A or B.

FIG. 12 is a table showing how Alice and Bob use their modulators in the apparatus of FIG. 11 when using a communication method in accordance with an embodiment of the present invention which is based on the BB84 protocol.

When sending photon pulses Alice's modulator applies a rotation selected randomly from 0°, 45°, 90° or 135°. As before, these phase states define two non-orthogonal phase bases {0°, 90°} and {45°, 135°}.

When Bob receives the pulses he then applies a rotation with his rotator 327 selected randomly from 0°, 45°, 90° or 135°. Thus, in the same way as described in relation to FIGS. 4 and 5 for phase, Bob uses his modulator to both change measurement basis and switch the associated bit value between the two detectors.

Although polarisation encoding has only been described in relation to the BB84 protocol, the method of this preferred embodiment may also be used with multiple bases.

FIG. 12 shows only the sifting scheme with orthogonal encoding sets. Sifting with non-orthogonal encoding sets can also be applied as described with reference to FIG. 7.

Figure 13:
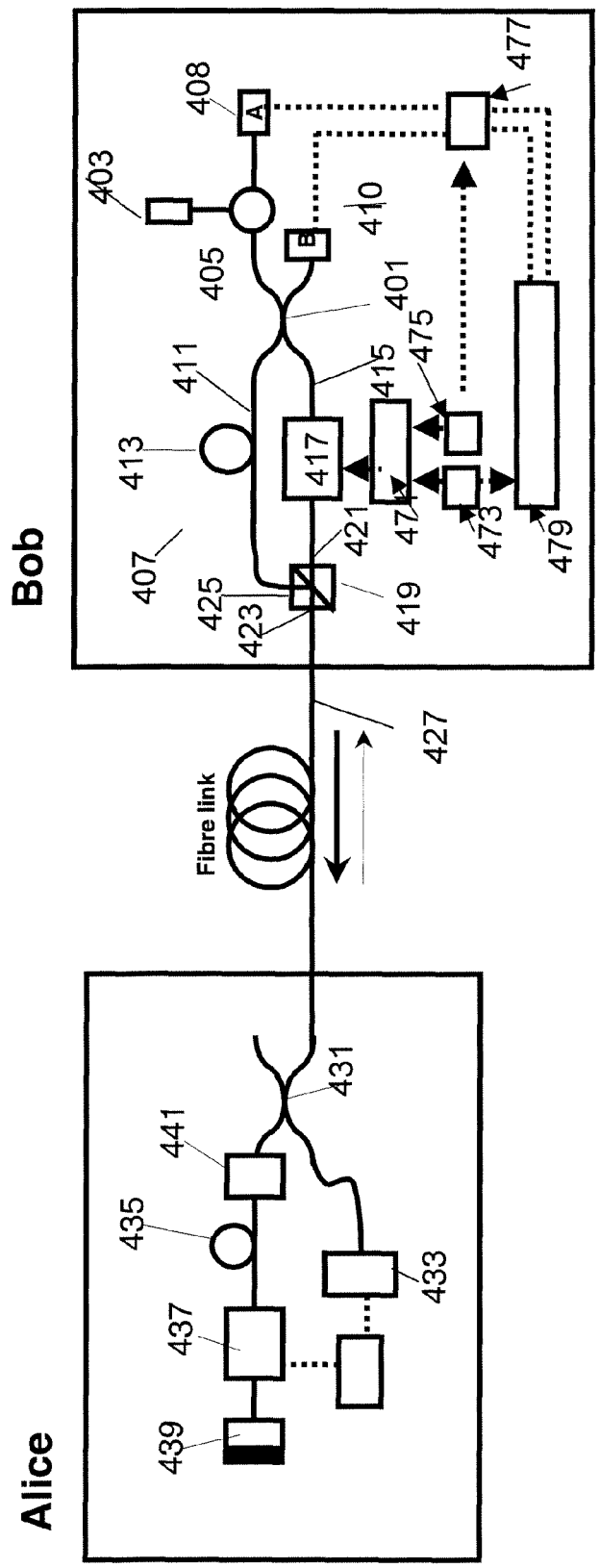
FIG. 13 schematically illustrates a quantum communication system using phase encoding in accordance with an embodiment of the present invention using reflection.

FIG. 13 schematically illustrates a self-compensating apparatus for multiple pulse quantum cryptography in accordance with a preferred embodiment of the present invention. Bob's equipment 401 comprises a signal laser diode 403, a fibre circulator 405, an imbalanced Mach-Zender polarisation maintaining fibre interferometer 407, and two single photon detectors 408, 410.

Bob's Mach-Zender interferometer 407 contains a 50/50 polarisation maintaining fibre coupler 409, a long arm 411 with a fibre delay loop 413, a short arm 415 with a phase modulator 417, a polarisation beam splitter 419, and the main processor electronics 479

The biasing electronics produce a clock signal for synchronisation with period $T_{clock}$, which may typically be 1 μs. The laser diode is bias to emit a number (N) of signal pulses during each clock cycle. Consecutive signal pulses with one clock cycle have a temporal separation of $t_{pulse}$ which may typically be chosen to be 2 ns.

The laser 403 is linearly polarised. The laser pulses are coupled into a particular polarisation axis, usually the slow axis, of a polarisation maintaining fibre.

The signal pulses are then fed into the imbalanced interferometer 407 through a circulator 405 and a polarisation maintaining fibre coupler 409. The length difference between the long arm 411 and the short arm 415 of the interferometer corresponds to an optical propagation delay Of $t_{delay}$. A pulse travelling through the long arm 411 (referred to below as the 'late pulse') will lag that travelling through the short arm 415 ('early pulse') by a time delay at the port 423 of the polarisation beam combiner/splitter 419 of the interferometer 407.

The long arm 411 and the short arm 415 are combined with a polarisation beam splitter 419. The fibre inputs of the polarisation beam combiner 419 are aligned in such a way that only photons propagating along a particular axis of the polarisation maintaining input fibre, usually the slow axis, are output from the combiner. For example, at the in-line input port 421, only photons polarised along the slow axis of the in-line input fibre are transmitted by the beam combiner/splitter 419 and pass into the output port 423 and photons polarised along the fast axis are reflected and lost. Meanwhile, at the 90° input port 425, only photons polarised along the slow axis of the 90° input fibre are reflected by the beam combiner 419 and pass into the output port, while those polarised along the fast axis will be transmitted and lost.

This means that the slow axis of one of the two input fibres is rotated by 90° relative to the output port. Alternatively the polarisation may be rotated using a polarisation rotator before one of the input ports of the polarising beam combiner. Thus photon pulses which passed through the long 411 and short 415 arms will have orthogonal linear polarisations on the output fibre 427.

The pulses are then transmitted to Alice along an optical fibre link. No further clock signal need be sent. The pulses are not attenuated before they are sent.

Alice first uses a fibre coupler 431 with an unbalanced coupling ratio, for example 90/10, to route 90% of signals into a photodetector 433 to measure the signal pulse intensity and also recover the clock.

The clock recovery electronics is designed to respond only to the first signal pulse in each clock cycle and to ignore the following ones. This may be achieved if the clock recovery electronics applies a dead time exceeding N $t_{pulse}$ but less than $t_{clock}$.

The exit from other arm of the fibre coupler is fed into a storage line 435 after passing an attenuator 441, then a phase modulator 437, and a Faraday mirror 439. The Faraday mirror 439 has the effect of rotating the polarisation of the incident pulses by 90°. The signal pulses reflected by the Faraday mirror pass back through the phase the modulator 437, the storage line 435, the attenuator 441 and the fibre coupler 431 subsequently. The reflected pulses then return to Bob along the optical fibre link.

Alice applies a voltage to her phase modulator when the early (i.e. that which passed through the phase modulator 417 in Bob's interferometer) pulse passes back through her phase modulator after reflection at the Faraday mirror.

Before the pulses leaving Alice's coupler, they are attenuated so that the average number of photons per pulse μ<<1. The level of attenuation is chosen according to the signal pulse intensity measured by the Alice's power meter 433.

When the signal pulses return to Bob's polarisation beam splitter, the polarisations of each early and late pulse have been swapped due to the reflection of the Faraday mirror 439 in Alice's equipment. So, the late pulse will be transmitted by the beamsplitter and propagate along the Short Arm, while the early pulse will be reflected into the Long Arm. They will then be fed into the polarisation maintaining fibre coupler.

There are two routes for a photon travelling from the Bob's fibre coupler to Alice and then reflected back to the Bob's coupler:
1. Bob's Long Arm—Alice—Bob's Short Arm
2. Bob's Short Arm—Alice—Bob's Long Arm The total length is exactly identical because a photon passes all the same components but just with different sequences. There is no need to actively balance the length of the two routes, as they are virtually the same and are automatically self-compensated. A photon passing two routes interferes with itself at Bob's polarisation maintaining fibre coupler.

By controlling the voltages applied to their modulators when the reflected pulses passing through, Alice and Bob determine in tandem whether two routes undergo constructive or destructive interference at each detector. Alice only modulates the reflected early pulse, while Bob modulates the reflected late pulse.

The polarisation maintaining fibre coupler at Bob's interferometer is attached to two single photon detectors, one of which is through a fibre circulator. This arrangement can be used to implement BB84 or B92 in a similar manner to those described previously.

As described with reference to the apparatus of FIG. 3, when Alice modulates the pulse she chooses a phase shift randomly chosen from 0°, 90°, 180° or 270°. As before, these phase states define two orthogonal encoding sets {0°, 180°} and {90°, 270°}. When Bob receives the reflected pulses he then applies a phase shift with his modulator 417 selected randomly from 0°, 90°, 180° or 270°. The phase modulator 417 operates under the control of phase modulator driver 471. Phase modulator driver receives inputs from first controller 473 which determines the measurement basis and inversion controller 475 which decides whether or not a 180° phase shift should be applied. The additional 180° phase shift serves to swap the roles of the detectors 403 and 408. Detection processor 477 receives an input from the inversion controller 475 to determine the bit value assigned to each detector for a specific measurement. Thus, in the same way as described in relation to FIG. 3 for phase, Bob uses his modulator to both change measurement basis and switch the associated bit value between the two detectors.

The apparatus of FIG. 13 may also be used for multiple bases as previously described.

Figure 14:
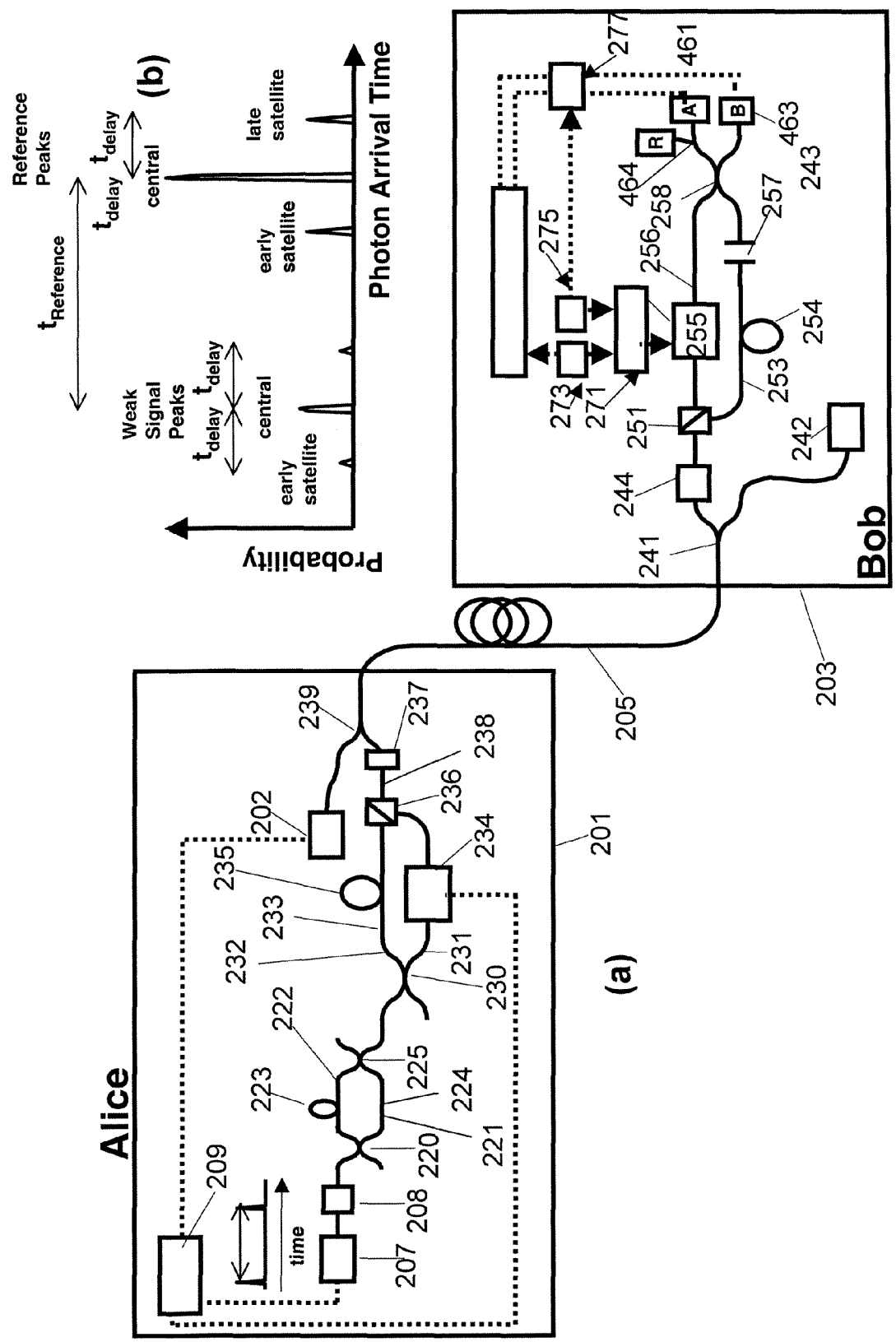
FIG. 14 schematically illustrates a quantum communication system using phase encoding in accordance with an embodiment of the present invention using a reference signal as well as data signals.

FIG. 14 shows an apparatus for quantum cryptography with active stabilisation in accordance with an embodiment of the present invention.

Alice and Bob's equipment is similar to that described with reference to FIG. 3. However, here the apparatus is configured so that a reference pulse may be sent from Alice 201 to Bob 203 and Bob's receiver is able to analyse the reference pulse and stabilise any phase or polarisation drift within the system.

As described with reference to FIG. 3, Alice 201 sends photons to Bob 203 along fibre 205.

Alice's equipment 201 comprises a signal laser diode 207, a polarisation rotator 208 connected to the output of said signal laser diode 207, a signal/reference pulse separator 224 connected to the output of said polarisation rotator 208, an imbalanced fibre Mach-Zender interferometer 233 for encoding photons connected to the output of the signal/reference pulse separator 224, an attenuator 237 connected to the output of the interferometer 233, a bright clock laser 202, a wavelength division multiplexing (WDM) coupler 239 connected to both the output of the attenuator 237 and the bright clock laser 202 and bias electronics 209. The biasing electronics 209 are connected to both the clock laser 202 and the signal laser 207.

The signal/reference pulse separator 224 comprises an entrance fibre optic coupler 220 with a first output connected to a long arm 222 with a loop of fibre 223 designed to cause an optical delay and short arm 221. The separator 224 further comprises an exit fibre optic coupler 225 combining two arms 221 and 222. All fibre in separator 224 is polarisation maintaining.

The encoding interferometer 233 is identical to that described in FIG. 4 and comprises an entrance coupler 230, a long arm 232 with a loop of fibre 235 designed to cause an optical delay, a short arm 231 with a phase modulator 234, and an exit polarising beam combiner 236. All components used in Alice's interferometer 233 are polarisation maintaining.

During each clock signal, the signal laser diode laser 207 outputs one optical pulse under the control of biasing electronics 209.

The polarisation of the signal pulses is rotated by a polarisation rotator 208 so that the polarisation is aligned to be parallel to a particular axis of the polarisation maintaining fibre, usually the slow axis, of the entrance coupler 220 of separator 224. Alternatively the polarisation rotator 208 may be omitted by rotating the signal laser diode 207 with respect to the axes of the entrance coupler 220 of separator 224.

The signal pulses are then fed into the signal/reference pulse separator 224 through polarisation maintaining fibre coupler 220. Signal pulses are coupled into the same axis, usually the slow axis of the polarisation maintaining fibre, from both output arms of the polarisation maintaining fibre coupler 220.

The long arm 222 of the signal/reference pulse separator 224 contains an optical fibre delay loop 223. The length difference of the two arms 221 and 222 corresponds to an optical propagation delay Of $t_{reference}$. Typically the length of the delay loop 223 may be chosen to produce a delay $t_{reference}$ ~10 ns. A photon travelling through the long arm 222 will lag that travelling through the short arm 221 by a time of $t_{reference}$ at the exit coupler 225 of the splitter 224.

The two arms 221 and 222 are combined together with an exit polarisation maintaining fibre optic coupler 225. One output is connected into one input of the encoding Mach-Zender interferometer 233.

Coupling ratio of two couplers 220 and 225 can be either fixed or variable. The ratios are chosen so that the reference and signal pulses have unequal intensities. Typically, before entering the encoding interferometer 233, the later reference pulse is 10-10000 times stronger than the earlier signal pulse. For example, the entrance coupler 220 may be asymmetric so as to allow 90% to 99.99% of the input into arm 221 and the exit coupler 225 may be a 50/50 coupler. Alternatively, both the entrance 220 and exit couplers 225 may be 50/50 couplers and an appropriate attenuator placed in arm 221.

Properties of the signal and reference pulses are exactly the same, for example polarisation, wavelength etc, except of course for their intensity and time of injection into the interferometer 233.

The signal and reference pulses are then fed into the imbalanced Mach-Zender interferometer 233 through a polarisation maintaining fibre coupler 230. Signal and reference pulses are coupled into the same axis, usually the slow axis of the polarisation maintaining fibre, from both output arms of the polarisation maintaining fibre coupler 230.

The long arm 232 of the interferometer 233 contains an optical fibre delay loop 235, while the short arm 231 contains a fibre optic phase modulator 234. The length difference of the two arms 231 and 232 corresponds to an optical propagation delay of $t_{delay}$. Typically the length of the delay loop 235 may be chosen to produce a delay $t_{delay}$ ~5 ns. A photon travelling through the long arm 232 will lag that travelling through the short arm 231 by a time Of $t_{delay}$ at the exit 236 of the interferometer 233.

The two arms 231, 232 are combined together with a polarisation beam combiner 236 into a single mode fibre 238. The fibre inputs of the polarisation beam combiner 236 are aligned in such a way that only photons propagating along particular axes of the polarisation maintaining fibre are output from the combiner 236. Typically, photons which propagate along the slow axis or the fast axis are output by combiner 236 into single mode fibre 238.

The polarising beam combiner 236 has two input ports, an in-line input port and a 90° input port. One of the input ports is connected to the long arm 232 of the interferometer 233 and the other input port is connected to the short arm 231 of the interferometer 233.

Only photons polarised along the slow axis of the in-line input fibre of the in-line input port are transmitted by the polarising beam combiner 236 and pass into the fibre 238. Photons polarised along the fast axis of the in-line input fibre of the input port are reflected and lost.

Meanwhile, at the 90° input port of the beam coupler 236, only photons polarised along the slow axis of the 90° input fibre are reflected by the beam combiner 236 and pass into the output port, while those polarised along the fast axis will be transmitted out of the beam combiner 236 and lost.

This means that the slow axis of one of the two input fibres is rotated by 90° relative to the output port. Alternatively the polarisation may be rotated using a polarisation rotator before one of the input ports of the polarising beam combiner.

Thus, photon pulses which passed through the long 232 and short arms 231 will have orthogonal polarisations.

Both the signal and reference pulses are then strongly attenuated by the attenuator 237 so that the average number of photons per pulse $\mu \ll 1$ for the signal pulses. The reference pulses are typically 10-1000 stronger than the signal pulses, and do not have to be attenuated to single photon level as information is only encoded upon signal pulses.

The attenuated pulses are then multiplexed with a bright laser clock source 202 at a different wavelength using a WDM coupler 239. The multiplexed signal is then transmitted to the receiver Bob 203 along an optical fibre link 205.

The clock may also be delivered in other ways. For example Alice may multiplex the signal pulses with a bright clock laser pulse at the same or different wavelength which is delayed relative to the start of the clock cycle and which does not coincide with the signal pulses. Alternatively the clock signal may be sent on a separate optical fibre. Alternatively, synchronisation may be achieved by using a timing reference.

Bob's equipment 203 comprises WDM coupler 241, a clock recovery unit 242 connected to one output of said WDM coupler 241, a polarisation controller 244 connected to the other output of said WDM coupler 241, an imbalanced Mach-Zender interferometer 256 connected to the output of polarisation controller 244, two single photon detectors R 261, B 263 connected to the two outputs of interferometer 256 and biasing electronics 243.

Bob's interferometer 256 contains an entrance polarising beam splitter 251, a long arm 253 containing a delay loop 254 and a variable delay line 257 is connected to an output of beam splitter 251, a short arm 252 containing a phase modulator 255 is connected to the other output of said beam splitter 251, and an exit polarisation maintaining 50/50 fibre coupler 258 coupling the output from the long 253 and short 252 arms. The phase modulator 255 is connected to a phase modulator driver 271. The phase modulator driver 271 is controlled by a first controller 273 and an inversion controller 275 as described with reference to FIG. 2. All components in Bob's interferometer 256 are polarisation maintaining. The detectors 261, 263 are connected to detection processor 277 and main processor 279. Detection processor 277 is connected to inversion controller 275.

Bob first de-multiplexes the transmitted signal received from fibre 205 using the WDM coupler 241. The bright clock laser 202 signal is routed to an optical receiver 242 to recover the clock signal for Bob to synchronise with Alice.

If Alice delivers the clock using an alternative method, Bob will recover the clock accordingly. If Alice sends the clock signal as a single bright pulse within each clock cycle which is delayed relative to signal pulses then Bob may use an imbalanced coupler, such as 90/10, to extract a fraction of the combined signal which is measured with a photo-diode. A clock pulse is then recovered if the incident intensity is above an appropriately set threshold. Alternatively Bob may detect the clock on a separate fibre or using a timing reference.

The signal pulses which are separated from the clock pulses by WDM coupler 241 are fed into a polarisation controller 244 to restore the original polarisation of the signal pulses. This is done so that signal pulses which travelled the short arm 231 in Alice's interferometer 233, will pass the long arm 253 in Bob's interferometer 256. Similarly, signal pulses which travelled through the long arm 232 of Alice's interferometer 233 will travel through the short arm 252 of Bob's interferometer 256.

The signal/reference pulses from signal laser 207 then pass through Bob's interferometer 256. An entrance polarising beam splitter 251 divides the incident pulses with orthogonal linear polarisations. The two outputs of the entrance polarisation beam splitter 251 are aligned such that the two output polarisations are both coupled into a particular axis, usually the slow axis, of the polarisation maintaining fibre. This ensures that signal pulses taking either arm will have the same polarisation at the exit 50/50 polarisation maintaining coupler 258. The long arm 253 of Bob's interferometer 256 contains an optical fibre delay loop 254 and a variable fibre delay line 257, and the short arm 252 contains a phase modulator 255. The two arms 252, 253 are connected to a 50/50 polarisation maintaining fibre coupler 258. One of the outputs of Bob's interferometer is attached with two single photon detectors R 465, A 461 through an asymmetric fibre optic coupler 464. The coupling ratio is typically 95/5, with 95% port attached with single photon detector A 461 for quantum key distribution, and the 5% port attached with single photon detector R 465 for monitoring reference pulses. The coupling ratio is chosen so high in order that the coupler 464 does not reduce photon count rate of the signal pulses significantly at the detector 461. Also, as the reference pulses can be set arbitrarily strong, 5% or even smaller coupling into the reference detector is enough for monitoring photon count rate of references pulses.

Due to the use of polarising components, there are, in ideal cases, only two routes for a signal pulse travelling from the entrance of Alice's encoding interferometer 233 to the exit of Bob's interferometer 256:
  i. Alice's Long Arm 232—Bob's Short Arm 252 (L-S) and
  ii. Alice's Short Arm 231—Bob's Long Arm 253 (S-L).

With respect to decoding the data pulses Bob's interferometer is operated in the same manner as described with reference to FIG. 3.

The variable delay line 257 at Bob's interferometer 256 is adjusted to make the propagation time along routes (i) and (ii) almost equal, within the signal laser coherence time which is typically a few picoseconds for a semiconductor distributed feed back (DFB) laser diode, and thereby ensure interference of the two paths.

The variable fibre delay line 257 can either be an airgap, or a fibre stretcher, driven by a piezo-electric actuator. Alternatively, the two delays can be balanced by carefully controlling the length of fibre in Alice's 233 and Bob's 256 interferometers. Fine adjustment of the length of the two optical paths can be achieved through the calibration of zero phase delay in the two modulators 234, 255.

It is important that the central arrival time window of the signal pulses at single photon detectors do not overlap temporally with any arrival windows of the reference pulses. Otherwise, interference visibility will decrease. This can be guaranteed by carefully choosing the lengths of the delay loops 223, 235 to ensure $t_{delay} < t_{reference}$.

The references pulses are used to actively monitor and stabilise the phase drift of Alice-Bob's encoding interferometer. The detector R 465 can be a single photon detector. It is gated to be on only upon the central arrival time of the reference peak and measure the count rate. If the system were perfectly stable, the counting rate is constant. Any variation in phase drift will be manifested by a varying counting rate. Bob uses any variation in the count rate measured by the reference detector R 465 as a feedback signal to the variable delay line 257. Thus the optical delay is adjusted to stabilise the counting rate in the reference detector, and compensate any phase drifts of Alice or Bob's interferometers.

It is most convenient to maintain the reference detector with a minimum count rate. In this case, destructive interference is maintained at the reference detector R 465 and the signal detector A 461.

The reference detector R 465 and associated electronics should integrate the count rate over a certain period of time in order to average statistical fluctuation in the arrival rate of the reference photons. The integration time may typically be a fraction of a second, for example, 0.1 second. Such feedback times are sufficient since the phase drift of the Alice and Bob's interferometers occurs over much longer time scales. For highly unstable environment, much shorter feedback times, for example, 0.1 ms, may be employed. Alternatively, the feedback signal may be used to recalibrate the zero point of both phase modulators.

The feedback electronics may also condition system for sudden shocks to the system, such as a sudden change in temperature. If a sudden change in count rate is detected in the reference detector R 465, the results in the signal detectors A 461 and B 463 can be ignored until the system regains stability.

The references pulses are also used to actively monitor and stabilise the polarisation drift of photons. The two satellites peaks of the reference peak in FIG. 14b are due to imperfect polarisation control by the controller 244 and therefore imperfect polarisation beam splitting of the entrance polarisation beam splitter 251 of Bob's interferometer 256. The early satellite peak arises from the short arm 231 of Alice's encoding interferometer 233 to Bob's Short Arm 252, and the late satellite peak arises from the long arm 232 of Alice's encoding interferometer 233 to Bob's long arm 253. By gating the reference detector R 465 to detect during the arrival of one of the satellite peaks and measure the photon counting rate, Bob can monitor the drift in the polarisation of the photons and actively stabilise it by feeding the measurement result back into the polarisation controller 244. The polarisation controller 244 rotates the polarisation of photons so as to minimise the count rate of the satellite peak of the reference pulse in the reference detector R 465.

The reference detector R 465 should integrate photon counts over a certain period of time in order to reduce statistical fluctuation. The integration time can again be as short as a fraction of a second, for example, 0.1 second. This is typically much faster than the time scale over which the polarisation drifts. Much shorter integration time can be chosen for system operates in unstable conditions.

In the system of FIG. 14, Alice's modulator 234 and Bob's modulator 255 can be configured in the same manner as described for Alice's modulator 191 and Bob's modulator 193 in order to encode photons as described with reference to FIGS. 3 to 5.

The reference pulses may be modulated by any of the above schemes in addition to the signal pulses. Thus, in order for Eve to measure the reference pulses correctly, she must also know their modulation which prevents Eve from obtaining information to stabilise her equipment and measure any pulses correctly.

FIG. 15 is a table illustrating a further coding method in accordance with an embodiment of the present invention. As described in more detail above, Alice uses her modulator to effect a phase shift comprising two components. The first component is randomly chosen from 0°, 90°, 180° or 270°. As before, these phase states define two orthogonal encoding sets $\{0°, 180°\}$ and $\{90°, 270°\}$. The second component $\Delta\phi$ can be any angle and may be different for each photon pulse. As before, prior to sending the photon pulses to Bob Alice either informs Bob which angle she will use for $\Delta\phi$ for each photon pulse or she gives information to Bob so that he can derive $\Delta\phi$ for each photon pulse sent by Alice. For example, Alice and Bob may pre-share a random number and expand the number deterministically to derive $\Delta\phi$.

When Bob receives the pulses he then applies a phase shift with his modulator 193 which has two components. As before, Bob's the first component is selected randomly from 0°, 90°, 180° or 270°. His second "authentication" component $\Delta\phi$ is exactly the same phase shift $\Delta\phi$ applied by Alice for the same pulse.

When considering the phase difference between the phase shifts applied by Alice and Bob's modulators, if both Alice and Bob use the same second component, the second component $\Delta\phi$ cancels out. As Bob knows whether or not he selected 0° or 180° he take this into account after he has compared measurement basis with Alice to unsure that he uses the correct bit-value for the key.

The above method where Alice and Bob use an "authentication" component $\Delta\phi$ can be implemented in any of the above described protocols or encoding methods.

The invention claimed is:

1. A measuring unit for determining information from an input signal, the input signal comprising photon pulses, the unit comprising
a decoder including an interferometer having first and second optical fiber paths and first and second outputs, said decoder being configured to perform a measurement on an input signal photon pulse using a first operator configured to distinguish between two orthogonal states of said input signal and a second operator selected from an inverting operator configured to invert the result of the measurement by the first operator by inverting the outputs of the decoder and a null operator configured to have a null effect on the result of the measurement by the first operator;
an inversion controller configured to select for each photon pulse whether the inverting operator or the null operator is used as the second operator;
at least one photon detector configured to detect the first and second outputs of said decoder; and
a detection processor connected to the inversion controller and configured to selectively invert a detected output of said at least one photon detector depending on the selected second operator.

2. A measuring unit according to claim 1, wherein said decoder is configured to perform a quantum measurement.

3. A measuring unit according to claim 1, wherein said decoder comprises the interferometer and is configured to apply phase shifts as said first and second operators.

4. A measuring unit according to claim 1, wherein said decoder comprises a polarisation rotator and is configured to apply polarisation rotations as said first and second operators.

5. A measuring unit according to claim 1, wherein said decoder further comprises first and second outputs each connected to a separate detector.

6. A measuring unit according to claim 1, wherein said measuring unit comprises a single detector, said single detector being connected to one of the outputs.

7. A measuring unit according to claim 1, wherein said measuring unit inverts the bit value of a particular detector firing if the inverting operator is applied.

8. A measuring unit according to claim 1, wherein the at least one photon detector comprises first and second photon detectors, wherein the first photon detector is configured to detect the first output of the decoder and the second photon detectors is configured to detect the second output of the decoder.

9. A measuring unit according to claim 1, wherein the at least one photon detector comprises a single photon detector configured to measure the first and second outputs of the decoder.

10. A quantum communication system comprising:
a sending unit comprising an encoder configured to encode carriers setting quantum states of the carriers;
a receiving unit comprising a measuring unit for determining information from an input signal, the input signal comprising photon pulses, the measuring unit comprising
a decoder including an interferometer having first and second optical fibre paths and first and second outputs, said decoder being configured to perform a measurement on an input signal photon pulse using a first operator configured to distinguish between two orthogonal states of said input signal and a second operator selected from an inverting operator configured to invert the result of the measurement by the first operator by inverting the outputs of the decoder and a null operator configured to have a null effect on the result of the measurement by the first operator;
an inversion controller configured to select for each photon pulse whether the inverting operator or the null operator is used as the second operator;
at least one photon detector configured to detect the first and second outputs of said decoder; and
a detection processor and connected to the inversion controller and configured to selectively invert a detected output of said at least one photon detector depending on the selected second operator.

11. A quantum communication system according to claim 10, wherein said encoder is configured to set the quantum states of the carriers to be one of at least four states, the encoder further comprising means to assign pairs of states to form an encoding set.

12. A quantum communication system according to claim 11, wherein the states in each set are orthogonal to one another.

13. A quantum communication system according to claim 11, wherein the states in each set are non-orthogonal to one another.

14. A quantum communication system according to claim 10, wherein the quantum communication system is fibre-optics based.

15. A quantum communication system according to claim 10, wherein the quantum communication system is free-space based.

16. A quantum communication method comprising:
sending an input signal comprising photon pulses having quantum information encoded on said input signal in the form of one of at least four quantum states;
measuring said photon pulses using a decoder having first and second outputs, said decoder being configured to perform a measurement on said input signal using two operators, a first operator configured to distinguish between two orthogonal states of said input signal and a second operator selected from an inverting operator configured to invert the result of the measurement by the first operator by inverting the outputs of the decoder and a null operator configured to have a null effect on the result of the measurement by the first operator, wherein measuring said photon pulses comprises selecting for each photon pulse one of the inverting operator and the null operator as the second operator;
detecting the first and second outputs of said decoder to obtain a result of said measurement; and
selectively inverting the detected result in order to compensate for the application of the inverting operator inverting the detected result if said inverting operator was applied.

17. A method according to claim 16, wherein the information is encoded on said carriers in the form of at least four states which form at least two encoding sets within each of which the quantum states are orthogonal to each other.

18. A method according to claim 16, wherein the information is encoded on said carriers in the form of at least four states which form at least two encoding sets within each of which the quantum states are non-orthogonal to each other.

* * * * *